United States Patent
Kim

(10) Patent No.: US 11,924,528 B2
(45) Date of Patent: Mar. 5, 2024

(54) IMAGE ACQUISITION APPARATUS PROVIDING WIDE COLOR GAMUT IMAGE AND ELECTRONIC APPARATUS INCLUDING THE SAME

(71) Applicant: SAMSUNG ELECTRONICS CO., LTD., Suwon-si (KR)

(72) Inventor: Woo-Shik Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 31 days.

(21) Appl. No.: 17/517,228

(22) Filed: Nov. 2, 2021

(65) Prior Publication Data

US 2022/0385864 A1    Dec. 1, 2022

(30) Foreign Application Priority Data

May 26, 2021    (KR) .................. 10-2021-0067898

(51) Int. Cl.
*H04N 23/15*    (2023.01)
*H04N 23/84*    (2023.01)
(Continued)

(52) U.S. Cl.
CPC ........... *H04N 23/15* (2023.01); *H04N 23/841* (2023.01); *H04N 25/134* (2023.01); *H04N 25/611* (2023.01)

(58) Field of Classification Search
CPC .... H04N 23/15; H04N 23/841; H04N 25/134; H04N 25/611; H04N 23/11; H04N 23/13;
(Continued)

(56) References Cited

U.S. PATENT DOCUMENTS 6,211,911 B1    4/2001    Komiya et al.
7,339,699 B1 *  3/2008    Suzuki ................. H04N 1/48
                                             358/1.9
(Continued)

FOREIGN PATENT DOCUMENTS

JP        8-116490 A       5/1996
JP     2009-260411 A      11/2009
(Continued)

OTHER PUBLICATIONS

Yamaguchi et al., "Color image reproduction based on the multispectral and multiprimary imaging: experimental evaluation", 2001, Proceedings of SPIE—The International Society for Optical Engineering, https://www.researchgate.net/publication/252895068, 13 pages total.

(Continued)

*Primary Examiner* — Chiawei Chen
(74) *Attorney, Agent, or Firm* — Sughrue Mion, PLLC

(57) ABSTRACT

An image acquisition apparatus includes a first image sensor configured to obtain a first image based on detection of a light of a first wavelength band; a second image sensor configured to obtain a second image based on detection of a light of a second wavelength band that is wider than the first wavelength band; and a processor configured to obtain a third image having a spatial resolution corresponding to the first image and a color gamut corresponding to the second image based on the first image and the second image. The image acquisition apparatus may provide an image with a high spatial resolution and a wide color gamut.

20 Claims, 25 Drawing Sheets

(51) Int. Cl.
*H04N 25/13* (2023.01)
*H04N 25/611* (2023.01)

(58) Field of Classification Search
CPC .... H04N 25/135; H04N 23/951; H04N 23/45; H04N 25/745
See application file for complete search history.

(56) References Cited

U.S. PATENT DOCUMENTS

| | | | |
|---|---|---|---|
| 8,106,978 B2 | 1/2012 | Komiya et al. | |
| 10,715,771 B1* | 7/2020 | Gerlach | H04N 9/03 |
| 10,819,925 B2* | 10/2020 | Kiser | G02B 27/106 |
| 10,891,721 B2 | 1/2021 | Kim et al. | |
| 2004/0169751 A1 | 9/2004 | Takemura et al. | |
| 2004/0263638 A1 | 12/2004 | Ohsawa et al. | |
| 2008/0259369 A1* | 10/2008 | Kanai | H04N 9/69 358/1.9 |
| 2009/0207268 A1* | 8/2009 | Watarai | H04N 23/843 348/222.1 |
| 2009/0256927 A1* | 10/2009 | Komiya | H04N 25/134 348/E5.025 |
| 2012/0025080 A1* | 2/2012 | Liu | H04N 23/88 250/332 |
| 2012/0056895 A1* | 3/2012 | Kanai | H04N 1/6058 345/590 |
| 2012/0218394 A1* | 8/2012 | Yoshino | A61B 1/0638 348/222.1 |
| 2015/0070528 A1* | 3/2015 | Kikuchi | H04N 23/80 348/224.1 |
| 2015/0319358 A1* | 11/2015 | Okazawa | H04N 25/704 348/279 |
| 2017/0150071 A1* | 5/2017 | Otsubo | H01L 27/14645 |
| 2019/0045114 A1* | 2/2019 | Ishibashi | H04N 23/6812 |
| 2019/0068846 A1* | 2/2019 | Jung | H04N 23/45 |
| 2019/0364263 A1 | 11/2019 | Jannard et al. | |
| 2020/0143549 A1* | 5/2020 | Weng | G06T 7/155 |
| 2020/0154088 A1 | 5/2020 | Otsubo et al. | |
| 2021/0055568 A1 | 2/2021 | Fukumoto | |
| 2022/0003906 A1 | 1/2022 | Kim et al. | |
| 2022/0279137 A1* | 9/2022 | Lasiter | H01L 27/14618 |
| 2023/0262352 A1 | 8/2023 | Kiser et al. | |

FOREIGN PATENT DOCUMENTS

| | | |
|---|---|---|
| JP | 2018-107817 A | 7/2018 |
| JP | 2019-512194 A | 5/2019 |
| JP | 2021-029509 A | 3/2021 |
| KR | 10-2022-0003955 A | 1/2022 |

OTHER PUBLICATIONS

Lee, et al., "Estimation of illumination spectrum from a hyperspectral image", 2019, IEIE Transactions on Smart Processing and Computing, vol. 8, No. 2, https://doi.org/10.5573/IEIESPC.2019.8.2.095, 5 pages total.

Wikipedia, "Image registration", 2022, https://en.wikipedia.org/wiki/Image_registration, 7 pages total.

Zhou et al., "Hyperspectral image super-resolution: a hybrid color mapping approach", 2016, Journal of Applied Remote Sensing, vol. 10, Issue 3, 21 pages total.

Sato, et al., "Illumination and reflectance spectra separation of a hyperspectral image meets low-rank matrix factorization," IEEE Conf. Computer Vision and Pattern Recognition (CVPR), 2015, 9 pages total.

"Colorimetry—part 6: CIEDE2000 colour-difference formula", 2014, ISO/CIE 11664-6, 18 pages total.

Communication dated Aug. 17, 2022 by the European Patent Office for European Patent Application No. 22162460.4.

Communication dated Oct. 31, 2023 by the Japanese Patent Office for Japanese Patent Application No. 2022-085042.

Communication dated Nov. 28, 2023 by the Korean Intellectual Property Office for Korean Patent Application No. 10-2021-0067898.

* cited by examiner

FIG. 12

IMAGE ACQUISITION APPARATUS PROVIDING WIDE COLOR GAMUT IMAGE AND ELECTRONIC APPARATUS INCLUDING THE SAME

CROSS-REFERENCE TO RELATED APPLICATION

This application is based on and claims priority under 35 U.S.C. § 119 to Korean Patent Application No. 10-2021-0067898, filed on May 26, 2021, in the Korean Intellectual Property Office, the disclosure of which is incorporated by reference herein in its entirety.

BACKGROUND

1. Field

Apparatuses and methods consistent with example embodiments relate to an image acquisition apparatus and an electronic apparatus including the same.

2. Description of the Related Art

An image sensor is a device that receives light incident from an object, and photoelectrically converts the received light to generate an electrical signal.

The image sensor uses a color filter consisting of an array of filter elements that selectively transmit red light, green light, and blue light for color expression, senses the amount of light that has passed through each filter element, and then forms a color image of the object through image processing.

In acquiring such an image, because a wavelength band transmitted by the filter elements provided in the color filter is limited, a color gamut that represents the object is limited.

SUMMARY

One or more example embodiments provide image acquisition apparatuses providing a wide color gamut image and electronic apparatuses including the same.

According to an aspect of an example embodiment, an image acquisition apparatus may include: a first image sensor configured to obtain a first image based on detection of a light of a first wavelength band; a second image sensor configured to obtain a second image based on detection of a light of a second wavelength band that is wider than the first wavelength band; and a processor configured to obtain a third image having a spatial resolution corresponding to the first image and a color gamut corresponding to the second image, based on the first image and the second image.

The processor may be further configured to correct a pixel value of the first image based on a pixel value of the second image to obtain the third image.

The processor may be further configured to register the first image and the second image on a two-dimensional plane, and correct the pixel value of the first image based on a correspondence relationship between pixels of the first image and pixels of the second image.

The processor may be further configured to register the first image and the second image after performing aberration correction on the first image and the second image.

The processor may be further configured to determine either the third image or the first image as an output image to be displayed.

The processor may be further configured to determine the first image and a difference image between the first image and the third image to be displayed.

The first image may indicate a first color gamut, and the third image may indicate a second color gamut that is wider than the first color gamut.

The first image sensor may include: a first pixel array comprising a first sensor layer in which a plurality of first sensing elements are arrayed; and a color filter arranged on the first sensor layer and comprising red filters, green filters, and blue filters that are alternately arranged.

The second image sensor may include: a second pixel array comprising a second sensor layer in which a plurality of second sensing elements are arrayed; and a spectral filter arranged on the second sensor layer, in which a plurality of filter groups that are repeatedly arranged. Each of the plurality of filter groups may include a plurality of unit filters having different transmission wavelength bands.

Each of the transmission wavelength bands of the plurality of unit filters may include a visible light band and has a wavelength band wider than the visible light band.

Each of the plurality of filter groups comprises 16 unit filters arranged in a 4×4 array.

The first pixel array and the second pixel array may be horizontally apart from each other on a same circuit board, to have a same focal length and a same field of view.

The circuit board may include first circuit elements processing a first signal from the first sensor layer and second circuit elements processing a second signal from the second sensor layer.

The image acquisition apparatus may include a timing controller configured to synchronize operations of the first circuit elements and the second circuit elements.

The image acquisition apparatus may include a memory in which data related to the first image and data related to the second image are stored.

The memory may be provided in the circuit board.

The image acquisition apparatus may include: a first imaging optical system that forms the first image of an object on the first image sensor and comprises one or more first lenses; and a second imaging optical system that forms the second image of the object on the second image sensor and comprises one or more second lenses.

The first imaging optical system and the second imaging optical system may be set to have a same focal length and a same field of view.

According to an aspect of another example embodiment, an electronic apparatus may include: an RGB sensor configured to detect a first light of a first wavelength band that is reflected from an object; a hyperspectral image sensor to detect a second light of a second wavelength band that is reflected from the object, wherein the second wavelength band is wider than the first wavelength band; and a process configured to: obtain a first image based on the first light of the first wavelength band, and a second image based on the second light of the second wavelength band; align the first image with the second image, based on position information of edges detected from the first image and the second image; and convert color of the first image based on the second image, while the first image is aligned with the second image.

The electronic apparatus may correspond to a mobile phone, a smartphone, a tablet, a smart tablet, a digital camera, a camcorder, a laptop computer, a television, a smart television, a smart refrigerator, a security camera, a robot, or a medical camera.

BRIEF DESCRIPTION OF THE DRAWINGS

The above and/or other aspects will be more apparent by describing certain example embodiments, with reference to the accompanying drawings, in which:

FIGS. 10 to 12 are views of exemplary pixel arrangements of a second image sensor provided in an image acquisition apparatus according to an example embodiment;

DETAILED DESCRIPTION

Figure 1:
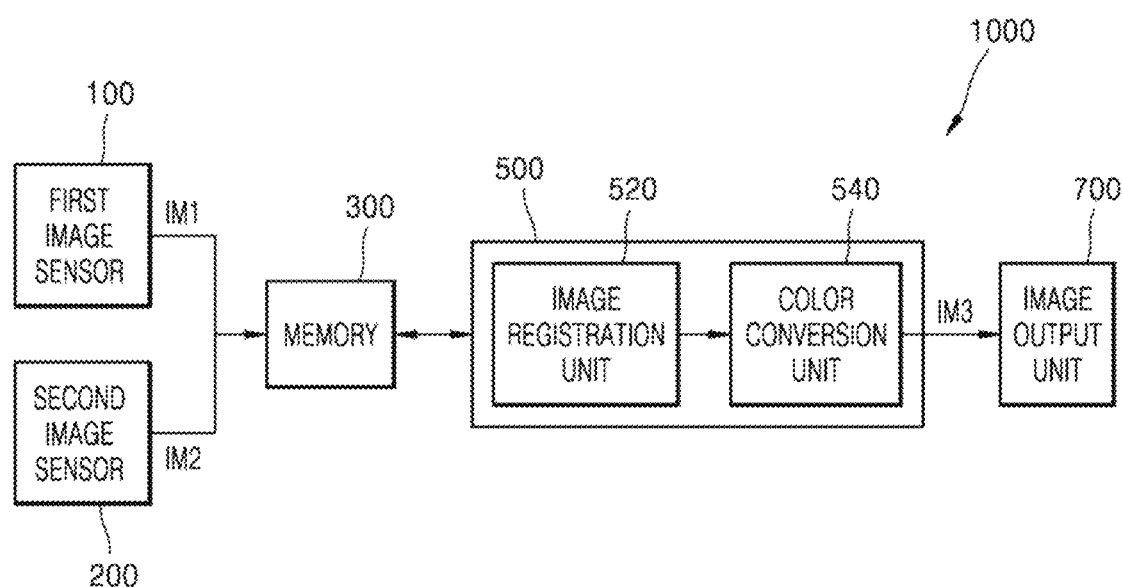
FIG. 1 is a block diagram of a schematic structure of an image acquisition apparatus according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail with reference to the accompanying drawings. The embodiments described below are only examples, and thus, it should be understood that the embodiments may be modified in various forms. Like reference numerals refer to like elements throughout. In the drawings, the sizes of constituent elements may be exaggerated for clarity.

For example, when an element is referred to as being "on" or "above" another element, it may be directly on the other element, or intervening elements may also be present.

It will be understood that, although the terms "first," "second," etc. may be used herein to describe various elements, these elements should not be limited by these terms. These terms are used only to differentiate an element from another element. These terms do not limit the material or structure of the components.

As used herein, the singular forms "a," "an," and "the" are intended to include the plural forms as well, unless the context clearly indicates otherwise. In addition, it will be understood that when a unit is referred to as "comprising" another element, it does not preclude the possibility that one or more other elements may exist or may be added.

In addition, the terms "-er", "-or", and "module" described in the specification mean units for processing at least one function and/or operation and can be implemented by hardware components or software components and combinations thereof.

The use of the terms "a," "an," and "the" and similar referents is to be construed to cover both the singular and the plural.

Operations constituting a method may be performed in any suitable order unless explicitly stated that they should be performed in the order described. Further, the use of any and all examples, or exemplary language (e.g., "such as") provided herein, is intended merely to better illuminate the inventive concept and does not pose a limitation on the scope of the present disclosure unless otherwise claimed.

Figure 2:
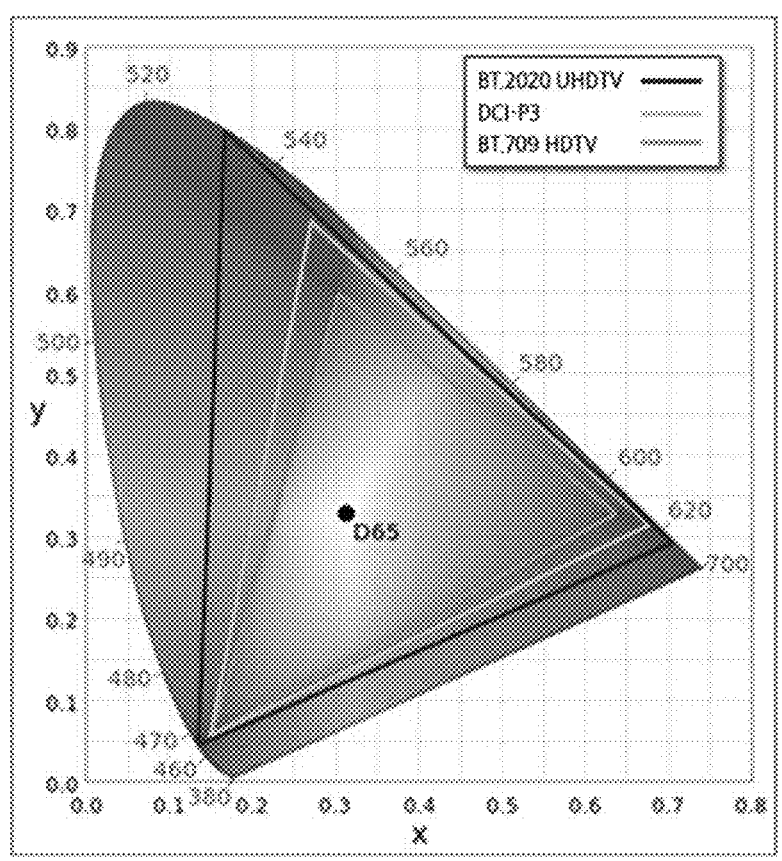
FIG. 2 is a color coordinate diagram illustrating a color gamut indicated by an image obtained by an image acquisition apparatus according to an example embodiment.

FIG. 1 is a block diagram of a schematic structure of an image acquisition apparatus according to an example embodiment, and FIG. 2 is a color coordinate diagram illustrating a color gamut indicated by an image obtained by an image acquisition apparatus according to an example embodiment.

An image acquisition apparatus 1000 includes a first image sensor 100 acquiring a first image IM1 based on a first wavelength band, a second image sensor 200 acquiring a second image IM2 based on a second wavelength band that is wider than the first wavelength band, and a processor 500 that signal-processes the first image IM1 and the second image IM2 and forms a third image IM3. The first image sensor 100 may detect and process a light of the first wavelength band to obtain the first image IM1, and the second image sensor 200 may detect and process a light of the second wavelength band to obtain the second image IM2.

The first image sensor 100 is a sensor employed in an RGB camera, and may be a CMOS image sensor using a Bayer color filter array. The first image IM1 obtained by the first image sensor 100 may be an RGB image based on red, green, and blue, and may have a color gamut range obtained by an RGB camera. For example, the first image IM1 may have a standard RGB (s-RGB) color gamut, a BT.709 color gamut, a DCI-P3 color gamut, or an Adobe RGB color gamut. FIG. 2 exemplarily shows the BT.709 color gamut and the DCI-P3 color gamut.

The second image sensor 200 is a sensor that senses light of more wavelengths than the first image sensor 100. The second image sensor 200 may use, for example, 16 channels, or 31 channels, or another number of channels. A bandwidth of each channel is set less than the R, G, and B bands, and the total bandwidth including a bandwidth of all channels includes an RGB bandwidth, that is, a visible light bandwidth, and may be wider than this. For example, the total bandwidth may have a bandwidth of about 350 nm to about 1000 nm. The second image IM2 obtained by the second image sensor 200 may be a hyperspectral image, may include a wavelength band that is greater than an RGB wavelength band, for example, a visible light band, and may be a wavelength-based image in which an ultraviolet to infrared wavelength band, which is wider than the visible light band, is divided into 16 or more channels. The second image IM2 may be an image obtained by using all available channels of the second image sensor 200, or may be an image obtained by selecting a specific channel. Spatial resolution of the second image IM2 may be lower than that of the first image IM1, but is not limited thereto.

The first image sensor 100 and the second image sensor 200 may be configured as separate chips or as a single chip in which the first image sensor 100 and the second image sensor 200 are stacked on top of each other via a three-dimensional (3D) stacking technology.

The third image IM3 is an image having spatial resolution corresponding to the first image IM1 by the first image sensor 100 and a color gamut corresponding to the second image IM2 by the second image sensor 200. The third image IM3 has the same spatial resolution as that of the first image IM1, and at the same time has an enlarged color gamut, and may have, for example, a color gamut range greater than or equal to DCI-P3 of FIG. 2. The quality of the formed third image IM3 may be evaluated by calculating a color difference from the first image IM1.

The third image IM3 may be obtained by correcting a pixel value of the first image IM1 with reference to or based on a pixel value of the second image IM2. To this end, the first image IM1 and the second image IM2 may be image-registered on a two-dimensional plane, and a correspondence relationship and/or a spatial relationship between pixels of the first image IM1 and pixels of the second image IM2 may be identified. Next, it is determined whether color conversion is required for each corresponding pixel, and the pixel value of the first image IM1 may be corrected accordingly.

Before image registration between the first image IM1 and the second image IM2, aberration correction may be performed on the first image IM1 and the second image IM2. Aberrations such as distortion, geometric aberration, and chromatic aberration may occur due to imaging lenses forming an optical image on the first image sensor 100 and the second image sensor 200, and after correcting aberrations, image registration may be performed.

The image acquisition apparatus 1000 may further include an image output unit 700. The image output unit 700 may output the third image IM3, or selectively output either the third image IM3 or the first image IM1. In addition, additional information regarding whether the output image is a normal RGB image (e.g., the first image IM1) or an image with an enlarged color gamut (e.g., the third image IM3) may be also output. The image output unit 700 may also output a difference image for a difference between the third image IM3 and the first image IM1, or may output the first image IM1 and the difference image together. At this time, it is determined whether color conversion has been performed for each area, and the difference image may be output only for an area where color conversion has been performed. Such a selective output may be determined by a user input.

An image processing process of the processor 500 will be described in more detail as follows.

An image registration unit 520 may perform image registration of the first image IM1 and the second image IM2 by using relative position information between the first image sensor 100 and the second image sensor 200. The image registration unit 520 identifies a positional relationship between each pixel of an image, based on spatial resolution of images obtained by the first image sensor 100 and the second image sensor 200, and a field of view, a focal length, and the like of an optical system used to obtain an image. At this time, based on an image of one sensor, an image of the other sensor may be overlaid thereon. For example, pixels of the second image IM2 respectively corresponding to pixels of the first image IM1 may be found based on the first image IM1 obtained by the first image sensor 100. To this end, scaling, translation, rotation, affine transform, perspective transform, etc. may be performed on pixels of the second image IM2. There may be one or more pixels of the second image IM2 corresponding to a pixel of the first image IM1, and pixel value of the second image IM2 corresponding to the pixel of the first image may be generated by mixing the pixels of the second image IM2 at a certain ratio according to positions. Image registration may also be performed using an image for each channel of the second image IM2. In order to increase the accuracy of registration, registration may be performed in units of sub-pixels. In sub-pixel registration, a pixel position may be expressed as a real number instead of an integer.

The image registration unit 520 may also increase the registration efficiency by allowing the first image sensor 100 and the second image sensor 200 to focus on an object at the same location through focus control. In addition, by making both sensors have the same field of view, image registration may be performed quickly and accurately. For example, when imaging optical systems for forming an optical image on the first image sensor 100 and the second image sensor 200 have the same focal length and the same field of view, only translation exists between the first image IM1 and the second image IM2, and a related parameter may be calculated using a relative position between the first image sensor 100 and the second image sensor 200 and focal lengths of respective optical systems.

When spatial resolution of the second image IM2 is higher than that of the first image IM1, image registration may be performed by downsampling the second image IM2. In this case, image registration may be performed more accurately by downsampling using filtering that considers edge information, such as bi-lateral filtering and guided filtering.

When the spatial resolution of the second image IM2 is lower than that of the first image IM1, a second image sample corresponding to each pixel position of the first image may be generated for each channel through interpolation. Similarly, interpolation may be performed considering edge information such as bi-lateral filtering and guided filtering.

Alternatively, image registration may be performed after the spatial resolution of the second image IM2 is made equal to the spatial resolution of the first image IM1. Demosaicing may be performed so that the two images have the same resolution. In this case, when two optical systems respectively forming optical images on two image sensors have the same focal length and field of view, image registration may be performed considering only translation without separate interpolation.

Before performing registration, aberrations in the first image IM1 and the second image IM2 may be corrected. That is, registration may be performed after correcting the effects of distortion, geometric aberration, chromatic aberration, etc. by a lens included in an imaging optical system used to obtain the first image IM1 and the second image IM2.

The image registration unit 520 may detect edges at which a brightness or intensity significantly changes in an image. The image registration unit 520 may extract edge feature information in the image and match features (e.g., edges) between two images. Because color distortion may occur when image registration is misaligned in a boundary area of an object, by extracting edge information and performing registration so that edges between two images are aligned, distortion may be prevented from occurring in the boundary area. Image registration may be performed using other image features such as corner points in addition to the edges.

For example, the image registration unit 520 may detect as the edges, boundaries of an object in the image at which image brightness changes sharply. When there are points having discontinuities in depth, discontinuities in surface orientation, changes in material properties, and/or variations in scene illumination, in the image, such points may be identified as edges corresponding to the boundaries of the object. The image registration unit 520 may obtain position information (e.g., x and y coordinates) of the edges detected from the first image IM1 and the second image IM2, and may align the first image IM1 with the second image IM2, based on the position information of the edges.

A color conversion unit 540 may use a pixel value included in the second image IM2 to perform linear transformation using the first image IM1. When the number of channels of the second image sensor 200 is n, linear transformation may be performed using a 3×n matrix. In other words, $$v'=Lv,$$

where v is an n-dimensional vector consisting of pixel values of the second image, L is a 3×n matrix, and v' is a 3-dimensional vector indicating R, G, and B values.

Alternatively, color mapping may be performed by converting v into an XYZ coordinate space and then converting the same back to an RGB color space. Alternatively, instead of the aforementioned linear transformation, a more complex transformation, such as considering a cross-channel or a quadratic term, may be used. Alternatively, a non-linear transformation method may be used.

At the time of color mapping, it is determined whether color mapping is required for each area, and color mapping of expanding a color gamut only for a necessary area may be performed. For example, after dividing an image area into a plurality of rectangular blocks, when a color gamut indicated by the second image for each block is within a color gamut indicated by the first image, color mapping may not be performed on the area. When the second image IM2 is out of the color gamut indicated by the first image IM1 in a corresponding area, color mapping is performed on the corresponding area. In order to display a wide color gamut (WCG) image (the third image) with an enlarged color gamut, an image may be stored using a bit-depth greater than that of a general RGB image.

In an example embodiment, the first image sensor 100 and the second image sensor 200 may be implemented by an RGB sensor, and a hyperspectral image (HSI) sensor, respectively. The HSI sensor may be configured to process a light of a wider bandwidth than a bandwidth that is to be processed by the RGB sensor, and may have a higher sensing precision than that of the RGB sensor. The image acquisition apparatus 1000 may include the RGB sensor and the HSI sensor, and a processor configured to combine the first image IM1 and the second image IM2 to obtain an image having a wide color gamut. The image acquisition apparatus 1000 may be referred to as a wide color gamut (WCG) sensor.

Figure 3:
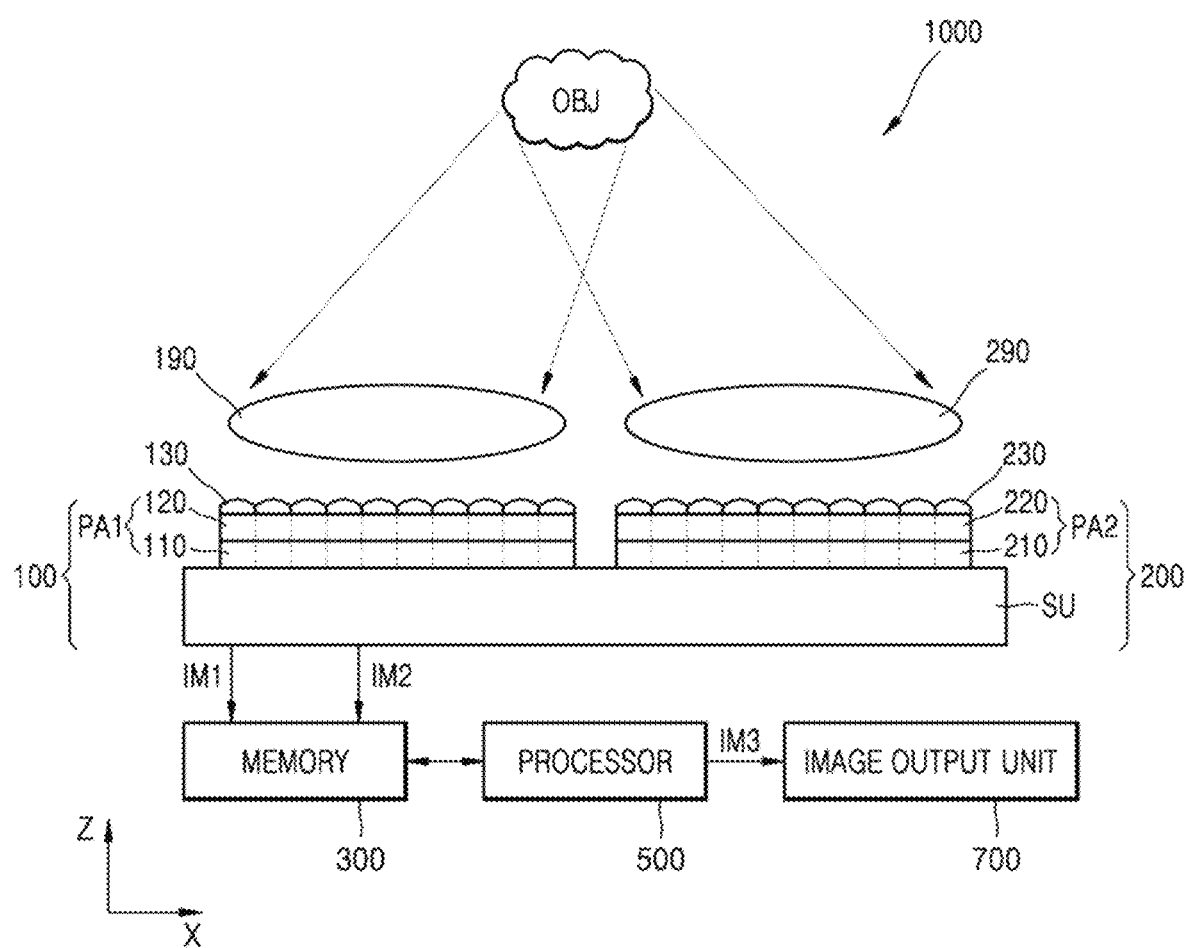
FIG. 3 is a conceptual diagram of a schematic structure of an image acquisition apparatus according to an example embodiment.
Figure 4:
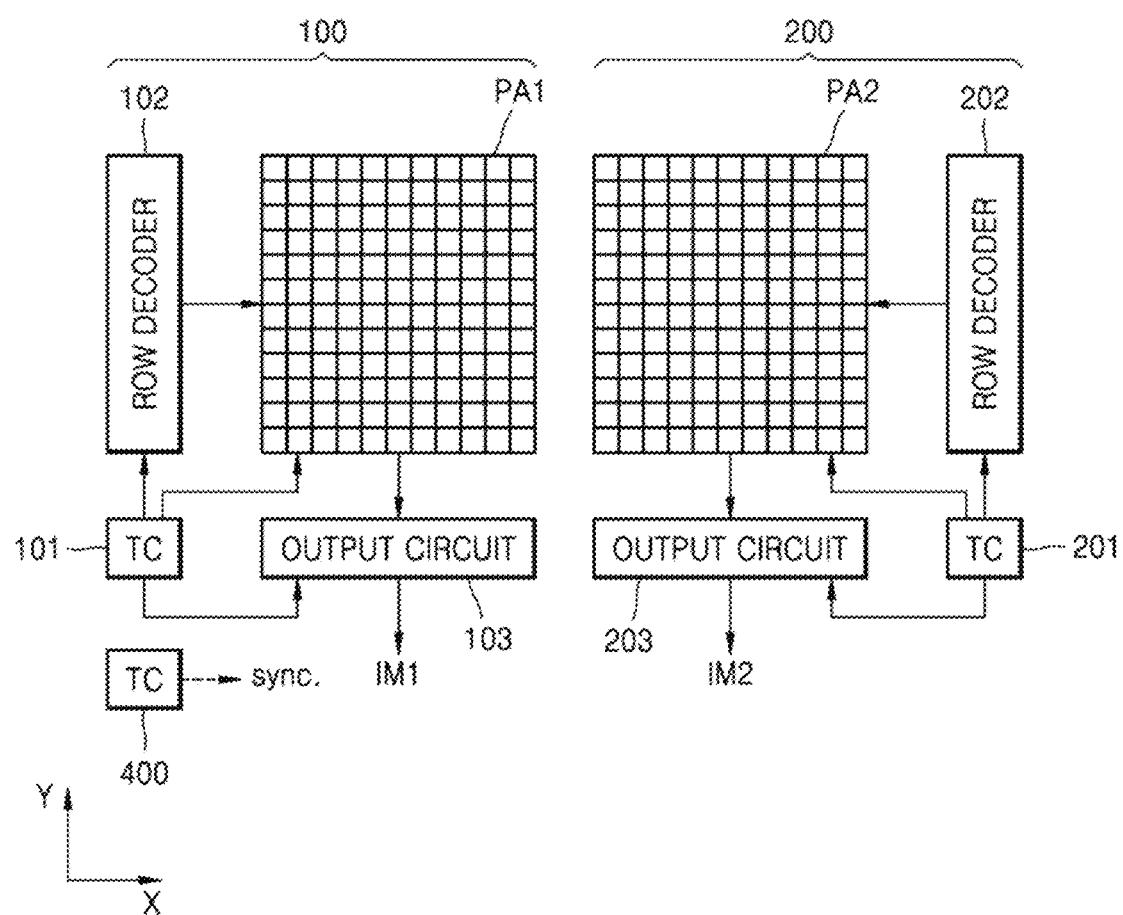
FIG. 4 is a view of circuit configurations of a first image sensor and a second image sensor provided in an image acquisition apparatus according to an example embodiment.

FIG. 3 is a conceptual diagram of a schematic structure of an image acquisition apparatus according to an example embodiment, and FIG. 4 is a view of circuit configurations of a first image sensor and a second image sensor provided in an image acquisition apparatus according to an example embodiment.

The image acquisition apparatus 1000 includes the first image sensor 100 acquiring the first image IM1 based on a first wavelength band, the second image sensor 200 acquiring the second image IM2 based on a second wavelength band that is wider than the first wavelength band, and the processor 500 that signal-processes the first image IM1 and the second image IM2 and forms the third image IM3. The image acquisition apparatus 1000 may further include a memory 300 storing data related to the first image IM1 and the second image IM2, and an image output unit 700 outputting an image.

The image acquisition apparatus 1000 may also include a first imaging optical system 190 that forms an optical image of an object OBJ on the first image sensor 100 and a second imaging optical system 290 that forms an optical image of the object OBJ on the second image sensor 200. Although each of the first imaging optical system 190 and the second imaging optical system 290 is illustrated as including one lens, this is illustrative and not limited thereto. The first imaging optical system 190 and the second imaging optical system 290 may be configured to have the same focal length and the same field of view. In this case, a process of registering the first image IM1 and the second image IM2 to form the third image IM3 may be easier. However, the disclosure is not limited thereto.

The first image sensor 100 includes a first pixel array PA1, and the first pixel array PA1 includes a first sensor layer 110 in which a plurality of first sensing elements are arrayed and a color filter 120 arranged on the first sensor layer 110. The color filter 120 may include red filters, green filters, and blue filters that are alternately arranged. A first micro lens array 130 may be on the first pixel array PA1. Various examples of a pixel arrangement applied to the first pixel array PA1 will be described with reference to FIGS. 5 to 8.

The second image sensor 200 includes a second pixel array PA2, and the second pixel array PA2 includes a second sensor layer 210 in which a plurality of second sensing elements are arrayed and a spectral filter 220 arranged on the second sensor layer 210. The spectral filter 220 includes a plurality of filter groups, and each of the plurality of filter groups may include a plurality of unit filters having different transmission wavelength bands. The spectral filter 220 may be configured to filter light in a wavelength band wider than that of the color filter 120 in a more subdivision than the color filter 120, the wavelength band, for example, being a wavelength band of an ultraviolet to infrared wavelength range. A first micro lens array 230 may be on the second pixel array PA2. An example of a pixel arrangement applied to the second pixel array PA2 will be described with reference to FIGS. 10 to 12.

The first sensor layer 110 and the second sensor layer 210 may include, but are not limited to, a charge coupled device (CCD) sensor or a complementary metal oxide semiconductor (CMOS) sensor.

The first pixel array PA1 and the second pixel array PA2 may be horizontally arranged on a same circuit board SU, for example, apart from each other in an X direction.

The circuit board SU may include first circuit elements for processing a signal from the first sensor layer 110 and second circuit elements for processing a signal from the second sensor layer 210. However, the disclosure is not limited thereto, and the first circuit elements and the second circuit elements may be provided on separate substrates, respectively.

Although the memory 300 in which data for the first image IM1 and the second image IM2 ARE stored is shown separately from the circuit board SU, this is only an example, and the memory 300 may be arranged on the same layer as the circuit elements in the circuit board SU or as a separate layer. The memory 300 may be a line memory that stores an image line by line, or a frame buffer that stores the entire image. The memory 300 may be static random access memory (SRAM) or dynamic random access memory (DRAM). The line memory may be implemented by a row buffer included in a DRAM chip.

Various circuit elements necessary for the image acquisition apparatus 1000 may be integrated and arranged on the circuit board SU. For example, a logic layer including various analog circuits and digital circuits may be provided, and a memory layer in which data is stored may be provided. The logic layer and the memory layer may be configured as different layers or a same layer.

Referring to FIG. 4, a row decoder 102, an output circuit 103, and a timing controller (TC) 101 are connected to the first pixel array PA1. The row decoder 102 selects and activates one row of the first pixel array PA1 in response to a row address signal output from the timing controller 101. The row decoder 102 may select and activate a plurality of rows one at a time, row by row. The output circuit 103 outputs a photo-sensing signal from a plurality of pixels arranged along a selected row in units of columns. To this end, the output circuit 103 may include a column decoder and an analog-to-digital converter (ADC). For example, the output circuit 103 may include a plurality of ADCs respectively arranged for each column between the column decoder and the first pixel array PA1, or one ADC arranged at an output terminal of the column decoder. The timing controller 101, the row decoder 102, and the output circuit 103 may be implemented as one chip or as separate chips. At least some of the illustrated circuit elements may be provided on the circuit board SU of FIG. 3. A processor for processing the first image IM1 output through the output circuit 103 may be implemented as a single chip together with the timing controller 101, the row decoder 102, and the output circuit 103.

A row decoder 202, an output circuit 203, and a timing controller (TC) 201 are also connected to the second pixel array PA2, and similar to the above, a signal from the second pixel array PA2 may be processed. In addition, a processor for processing the second image IM2 output from the output circuit 203 may be implemented as a single chip together with the TC 201, the row decoder 202, and the output circuit 203.

Although in the drawing, the first pixel array PA1 and the second pixel array PA2 are shown to have the same size and number of pixels, this is an example and not limited thereto.

In operating two different types of sensors, timing control may be required according to different resolutions and output speeds, and the size of an area required for image registration. For example, when one image column is read based on the first image sensor 100, an image column of the second image sensor 200 corresponding to the area may already be stored in a buffer or may need to be read anew. It is necessary to correctly calculate these timings and readout them. Alternatively, operations of the first image sensor 100 and the second image sensor 200 may be synchronized using the same synchronization signal. For example, a timing controller (TC) 400 may be further provided to transmit a synchronization signal sync. to the first image sensor 100 and the second image sensor 200.

Figure 5:
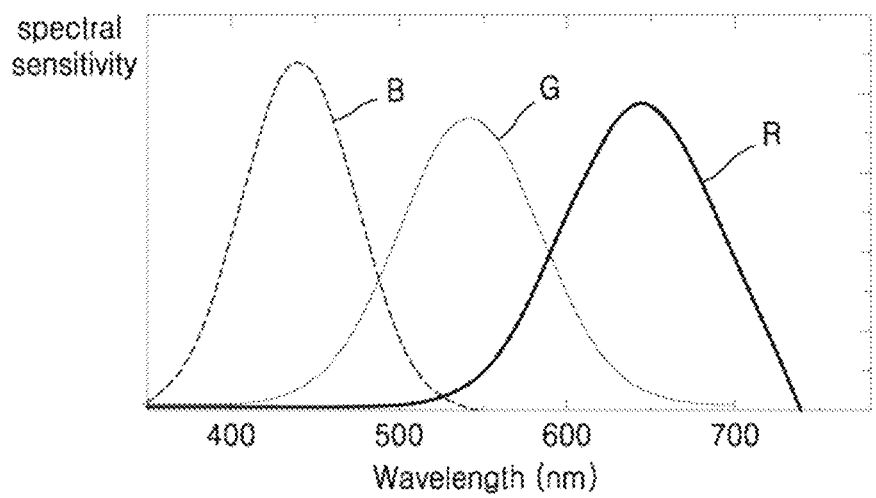
FIG. 5 is a view of a wavelength spectrum of a first image sensor provided in an image acquisition apparatus according to an example embodiment.
Figure 6:
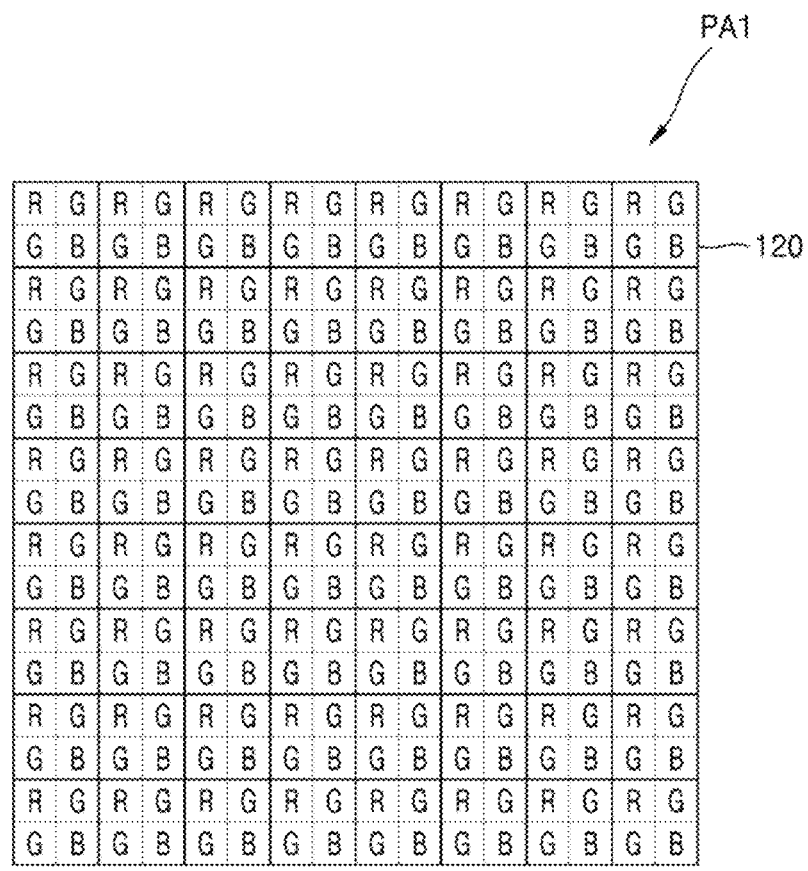
FIGS. 6 to 8 are views of exemplary pixel arrangements of a first image sensor provided in an image acquisition apparatus according to an example embodiment.
Figure 7:
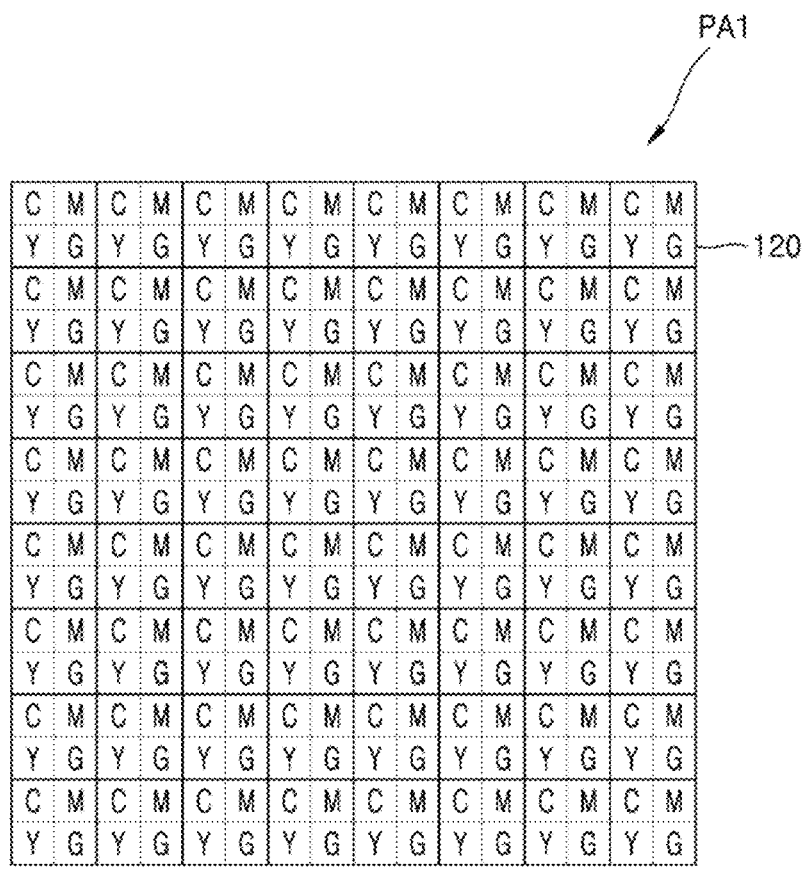
Figure 8:

FIG. 5 is a view of a wavelength spectrum of a first image sensor provided in an image acquisition apparatus according to an example embodiment, and FIGS. 6 to 8 are views of exemplary pixel arrangements of a first image sensor provided in an image acquisition apparatus according to an example embodiment.

Referring to FIG. 6, in the color filter 120 provided in the first pixel array PA1, filters for filtering red (R), green (G), and blue (B) wavelength bands are arranged in a Bayer pattern. That is, one unit pixel includes sub-pixels arranged in a 2×2 array, and a plurality of unit pixels are repeatedly arranged two-dimensionally. A red filter and a green filter are arranged in one row of a unit pixel, and a green filter and a blue filter are arranged in a second row. A pixel arrangement may be made in other ways than the Bayer pattern.

For example, referring to FIG. 7, a CYGM arrangement in which a magenta pixel (M), a cyan pixel (C), a yellow pixel (Y), and a green pixel (G) constitute one unit pixel may also be made. In addition, referring to FIG. 8, an RGBW arrangement in which a green pixel (G), a red pixel (R), a blue pixel (B), and a white pixel (W) constitute one unit pixel may also be made. Furthermore, although not shown, the unit pixel may have a 3×2 array shape. Moreover, pixels of the first pixel array PA1 may be arranged in various ways according to color characteristics of the first image sensor 100.

Figure 9:
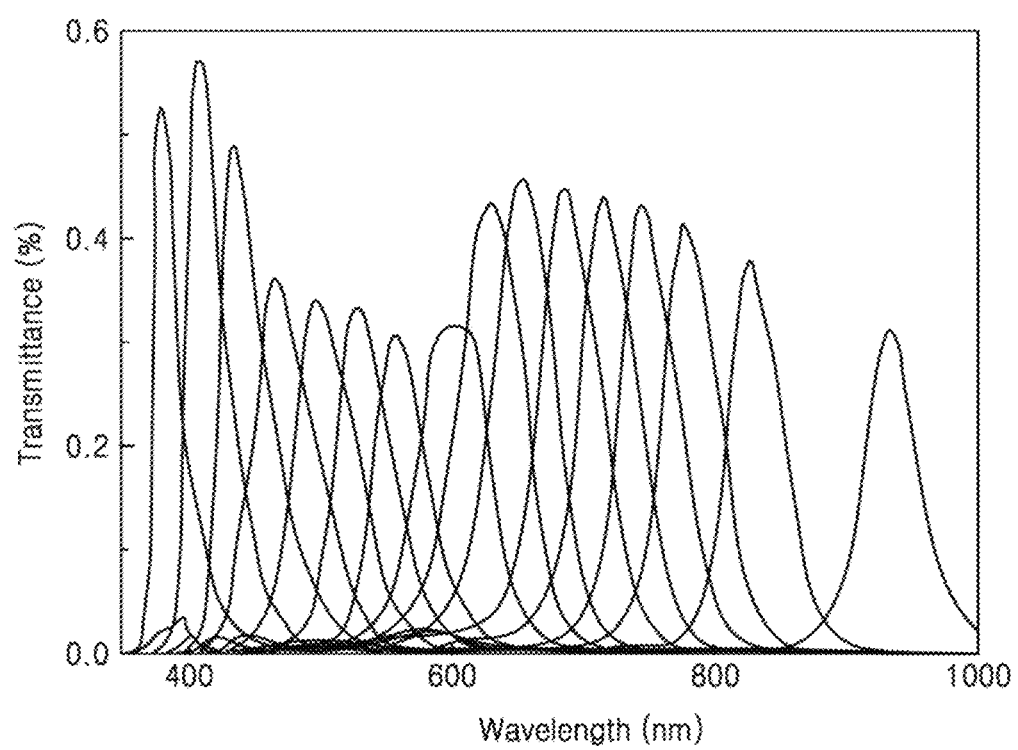
FIG. 9 is a view of a wavelength spectrum of a second image sensor provided in an image acquisition apparatus according to an example embodiment.
Figure 10:
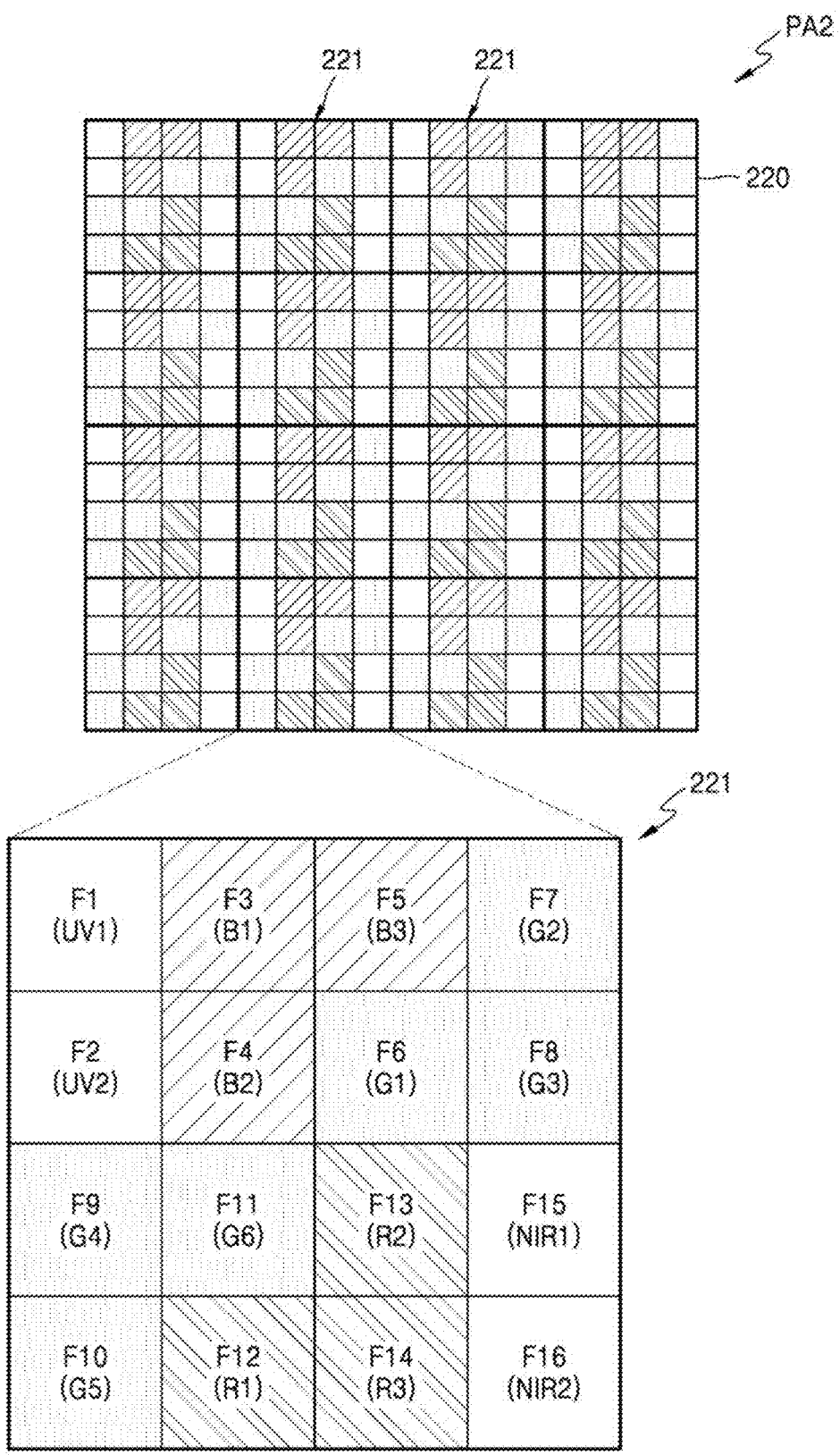
Figure 11:
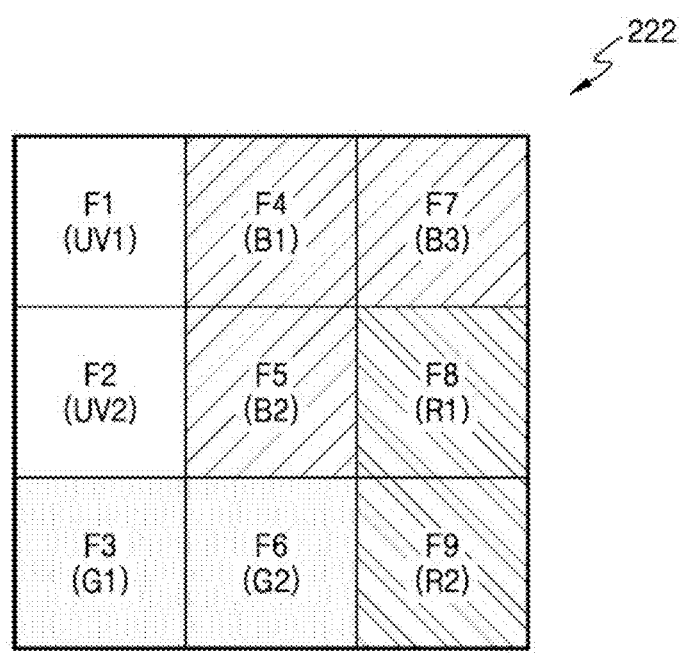
Figure 12:
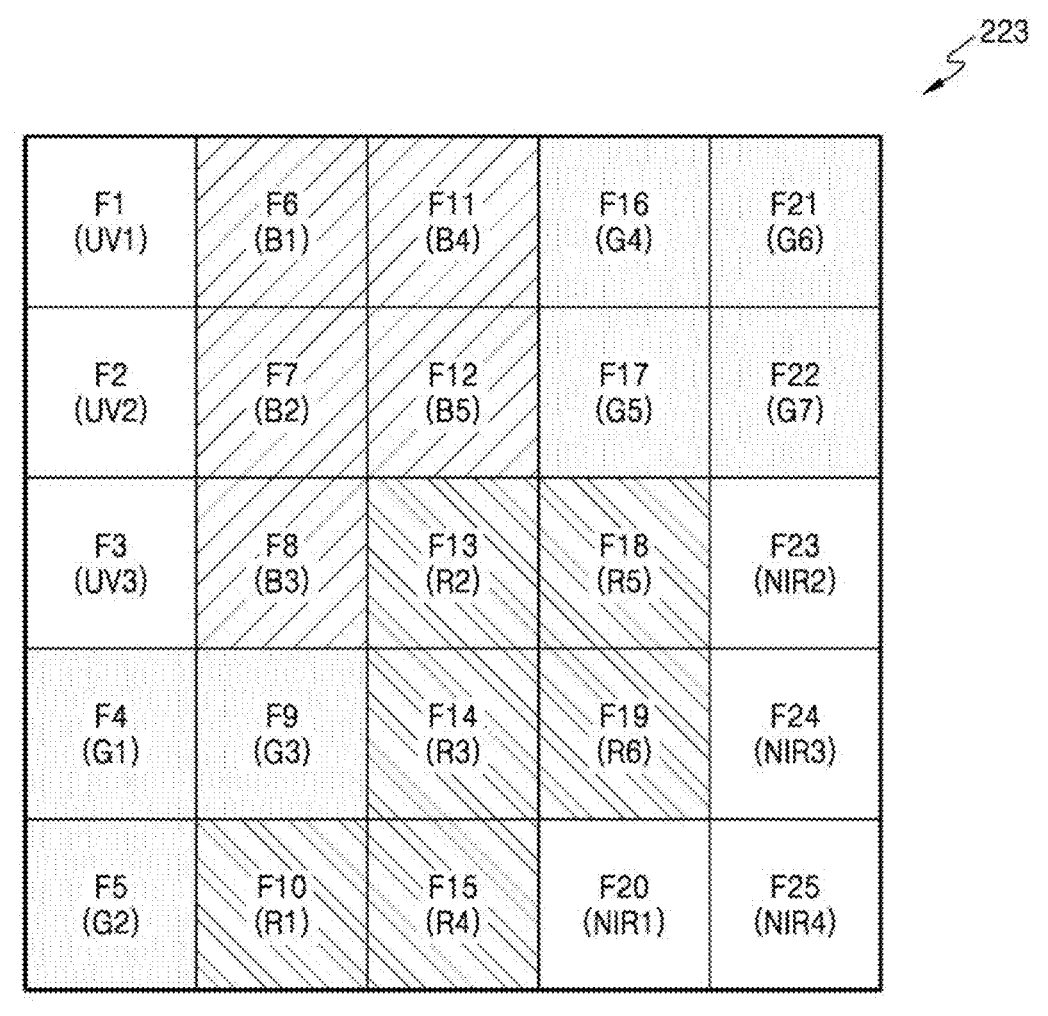

FIG. 9 is a view of a wavelength spectrum of a second image sensor provided in an image acquisition apparatus according to an example embodiment, and FIGS. 10 to 12 are views of exemplary pixel arrangements of a second image sensor provided in an image acquisition apparatus according to an example embodiment.

Referring to FIG. 10, the spectral filter 220 provided in the second pixel array PA2 may include a plurality of filter groups 221 arranged in a two-dimensional form. Each filter group 221 may include 16 unit filters F1 to F16 arranged in a 4×4 array.

First and second unit filters F1 and F2 may have center wavelengths UV1 and UV2 in an ultraviolet wavelength band, and third to fifth unit filters F3 to F5 may have center wavelengths B1 to B3 of a blue light wavelength band. Sixth to eleventh unit filters F6 to F11 may have center wavelengths G1 to G6 of a green light wavelength band, and twelfth to fourteenth unit filters F12 to F14 may have center wavelengths R1 to R3 of a red light wavelength band. In addition, fifteenth and sixteenth unit filters F15 and F16 may have center wavelengths NIR1 and NIR2 in a near-infrared wavelength band.

FIG. 11 is a plan view of one filter group 222 of another example provided in the spectral filter 220. Referring to FIG. 11, the filter group 222 may include nine unit filters F1 to F9 arranged in a 3×3 array. The first and second unit filters F1 and F2 may have the center wavelengths UV1 and UV2 in the ultraviolet wavelength band, and the fourth, fifth, and seventh unit filters F4, F5, and F7 may have the center wavelengths B1 to B3 of the blue light wavelength band. The third and sixth unit filters F3 and F6 may have the center wavelengths G1 and G2 of the green light wavelength band, and the eighth and ninth unit filters F8 and F9 may have the center wavelengths R1 and R2 of the red light wavelength band.

FIG. 12 is a plan view of one filter group 223 of another example provided in the spectral filter 220. Referring to FIG. 12, the filter group 223 may include 25 unit filters F1 to F25 arranged in a 5×5 array. The first to third unit filters F1 to F3 may have center wavelengths UV1 to UV3 in the ultraviolet wavelength band, and the sixth, seventh, eighth, eleventh, and twelfth unit filters F6, F7, F8, F11, and F12 may have center wavelengths B1 to B5 of the blue light wavelength band. The fourth, fifth and ninth unit filters F4, F5, and F9 may have center wavelengths G1 to G3 of the green light wavelength band, and the tenth, thirteenth, fourteenth, fifteenth, eighteenth, and nineteenth unit filters F10, F13, F14, F15, F18, and F19 may have center wavelengths R1 to R6 of the red light wavelength band. In addition, the 20th, 23rd, 24th, and 25th unit filters F20, F23, F24, and F25 may have center wavelengths NIR1 to NIR4 in the near-infrared wavelength band.

The above-described unit filters provided in the spectral filter 220 may have a resonance structure having two reflection plates, and a transmitted wavelength band may be determined according to characteristics of the resonance structure. The transmission wavelength band may be adjusted according to a material of the reflection plate, a material of a dielectric material in a cavity, and a thickness of the cavity. In addition, a structure using a grating, a structure using a distributed Bragg reflector (DBR), etc. may be applied to a unit filter.

Furthermore, pixels of the second pixel array PA2 may be arranged in various ways according to color characteristics of the second image sensor 200.

Figure 13:
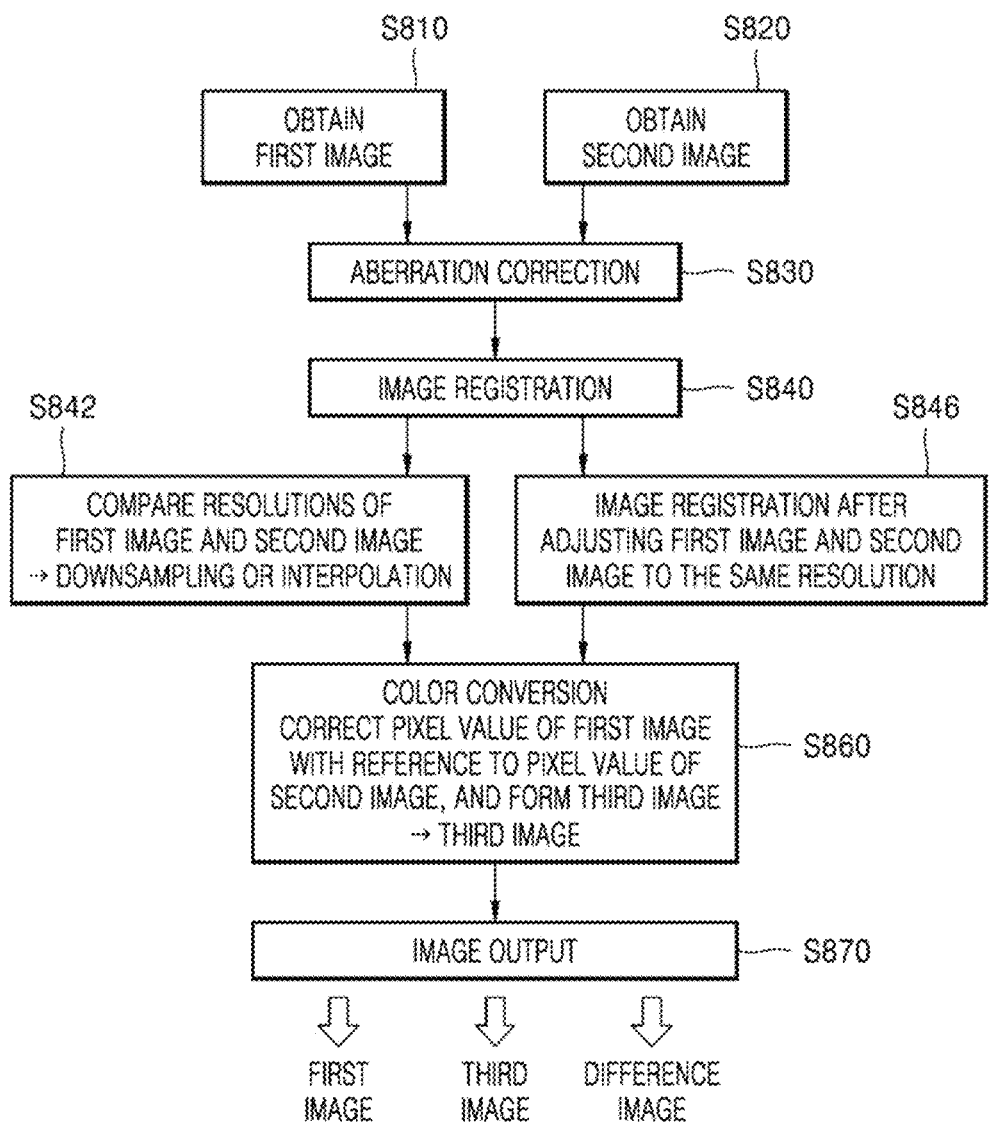
FIG. 13 is a flowchart illustrating an image processing process of an image acquisition apparatus according to an example embodiment.

FIG. 13 is a flowchart illustrating an image processing process of an image acquisition apparatus according to an example embodiment.

In operation S810, a first image is obtained from the first image sensor 100, and in operation S820, a second image is obtained from the second image sensor 200.

In operation S830, aberration correction may be performed on the first image and/or the second image, if necessary. For example, registration may be performed after correcting the effects of distortion, geometric aberration, chromatic aberration, etc. by a lens included in an imaging optical system used to obtain the first image IM1 and the second image IM2.

In operation S840, the first image and the second image are registered. In operation S842, the image registration of the first image and the second image is performed based on resolutions of the first image and the second image. For example, when spatial resolution of the second image IM2 is higher than that of the first image IM1, image registration may be performed by downsampling the second image IM2. When the spatial resolution of the second image IM2 is lower than that of the first image IM1, a second image sample corresponding to each pixel position of the first image may be generated for each channel through interpolation. Edge information may be considered such as bi-lateral filtering and guided filtering during image registration.

Alternatively, in operation S846, image registration may be performed after the first image and the second image are adjusted to the same resolution. Demosaicing may be performed so that resolutions of the first image and the second image become the same. In this case, when two optical systems respectively forming optical images on two image sensors have the same focal length and field of view, image registration may be performed considering only translation without separate interpolation.

In operation S860 of color conversion, a pixel value of the first image is corrected with reference to or based on a pixel value of the second image, and a third image is formed. In this case, it may be determined whether color conversion is required for each area, and color conversion of expanding a color gamut may be performed only for the required area. For example, after dividing an image area into a plurality of blocks, it is determined for each block whether a color gamut indicated by the second image is within a color gamut indicated by the first image. Only when the second image IM2 is outside the color gamut indicated by the first image IM1 in a corresponding area, color conversion may be performed on the corresponding area.

In operation S870 of image output, any one or more of the first image, the third image, and a difference image between the first image and the third image may be selectively output. Additional information about the images may be also output.

The image acquisition apparatus 1000 described above may be employed in various high-performance optical devices or high-performance electronic apparatuses. The electronic apparatus may be, for example, a smartphone, a mobile phone, a cell phone, a personal digital assistant (PDA), a laptop, a personal computer (PC), various portable devices, home appliances, a security camera, a medical camera, an automobile, an Internet of Things (IoT) device, or another mobile or non-mobile computing device, but is not limited thereto.

In addition to the image acquisition apparatus 1000, the electronic apparatus may further include a processor for controlling image sensors provided therein, for example, an application processor (AP), may control a plurality of hardware or software components by driving an operating system or an application program through a processor, and may perform various data processing and operations. The processor may further include a graphics processing unit (GPU) and/or an image signal processor. When the processor includes an image signal processor, an image (or video) obtained by the image sensor may be stored and/or output using the processor.

Figure 14:
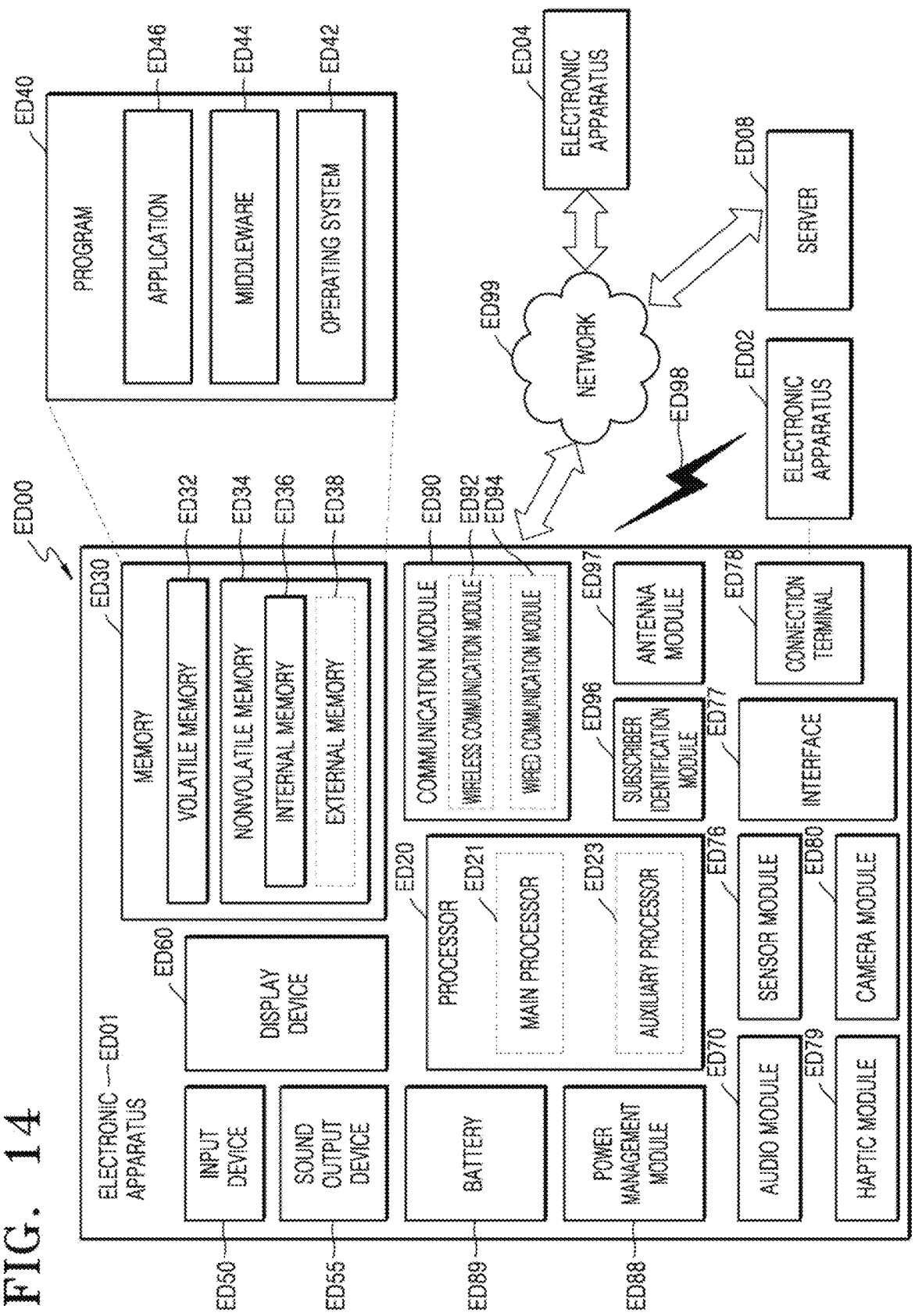
FIG. 14 is a block diagram of a schematic structure of an electronic apparatus according to an example embodiment.

FIG. 14 is a block diagram of a schematic structure of an electronic apparatus according to an example embodiment. Referring to FIG. 14, in a network environment ED00, an electronic apparatus ED01 may communicate with another electronic apparatus ED02 through a first network ED98 (a near-field wireless communication network, etc.) or may communicate with another electronic apparatus ED04 and/or a server ED08 through a second network ED99 (a far-field wireless communication network, etc.). The electronic apparatus ED01 may communicate with the electronic apparatus ED04 through the server ED08. The electronic apparatus ED01 may include a processor ED20, a memory ED30, an input device ED50, a sound output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. In the electronic apparatus ED01, some (the display device ED60, etc.) of the components may be omitted, or other components may be added. Some of these components may be implemented in one integrated circuit. For example, the sensor module ED76 (a fingerprint sensor, an iris sensor, an illuminance sensor, etc.) may be implemented by being embedded in the display device ED76 (a display, etc.).

The processor ED202 may execute software (a program ED40, etc.) to control one or more other components (hardware or software components, etc.) of the electronic apparatus ED01 connected to the processor ED20, and may perform a variety of data processing or operations. As a portion of the data processing or operations, the processor ED20 may load instructions and/or data received from other components (the sensor module ED76, the communication module ED90, etc.) into a volatile memory ED32, may process instructions and/or data stored in the volatile memory ED32, and may store result data in a nonvolatile memory ED34. The processor ED20 may include a main processor ED21 (a central processing unit, an application processor, etc.) and an auxiliary processor ED23 (a GPU, an image signal processor, a sensor hub processor, a communication processor, etc.) that may be operated independently or together. The auxiliary processor ED23 uses less power than the main processor ED21 and may perform specialized functions.

The auxiliary processor ED23 may control functions and/or states related to some (the display device ED60, the sensor module ED76, the communication module ED90, etc.) of the components of the electronic apparatus ED01 on behalf of the main processor ED21 while the main processor ED21 is in an inactive (e.g., sleep) state or with the main processor ED21 while the main processor ED21 is in an active (e.g., application execution) state. The auxiliary processor ED23 (an image signal processor, a communication processor, etc.) may be implemented as a portion of other functionally relevant components (the camera module ED80, the communication module ED90, etc.).

The memory ED30 may store a variety of data required by the components (the processor ED20, the sensor module ED76, etc.) of the electronic apparatus ED01. The data may include, for example, software (the program ED40, etc.) and input data and/or output data for commands related thereto. The memory ED30 may include the volatile memory ED32 and/or the nonvolatile memory ED34. The nonvolatile memory ED32 may include an internal memory ED36 fixed in the electronic apparatus ED01 and a removable external memory ED38.

The program ED40 may be stored as software in the memory ED30, and may include an operating system ED42, middleware ED44, and/or an application ED46.

The input device ED50 may receive commands and/or data to be used for the components (the processor ED20, etc.) of the electronic apparatus ED01 from the outside (a user, etc.) of the electronic apparatus ED01. The input device ED50 may include a microphone, mouse, keyboard, and/or digital pen (a stylus pen, etc.).

The audio output device ED55 may output an audio signal to the outside of the electronic apparatus ED01. The audio output device ED55 may include a speaker and/or a receiver. The speaker may be used for general purposes such as multimedia playback or recording playback, and the receiver may be used to receive incoming calls. The receiver may be combined as a portion of the speaker or may be implemented as a separate device.

The display device ED60 may visually provide information to the outside of the electronic apparatus ED01. The display device ED60 may include a display, a hologram device, or a projector, and a control circuit for controlling devices. The display device ED60 may include touch circuitry set to sense a touch, and/or sensor circuitry (a pressure sensor, etc.) configured to measure the intensity of force generated by the touch.

The audio module ED70 may convert sound into an electrical signal, or vice versa. The audio module ED70 may obtain sound through the input device ED50, or may output sound through the audio output device ED55 and/or speakers and/or headphones of another electronic apparatus (the electronic apparatus ED02, etc.) directly or wirelessly connected to the electronic apparatus ED01.

The sensor module ED76 may detect an operating state (power, temperature, etc.) of the electronic apparatus ED01 or an external environmental state (user status, etc.), and may generate an electrical signal and/or a data value corresponding to the detected state. The sensor module ED76 may include a gesture sensor, a gyro sensor, a barometric sensor, a magnetic sensor, an acceleration sensor, a grip sensor, a proximity sensor, a color sensor, an infrared (IR) sensor, a biological sensor, a temperature sensor, a humidity sensor, and/or an illuminance sensor.

The interface ED77 may support one or more designated protocols, which may be used to directly or wirelessly connect the electronic apparatus ED01 with other electronic apparatuses (the electronic apparatus ED02, etc.). The interface ED77 may include a high definition multimedia interface (HDMI), a universal serial bus (USB) interface, a secure digital (SD) card interface, and/or an audio interface.

A connection terminal ED78 may include a connector through which the electronic apparatus ED01 may be physically connected to other electronic apparatuses (the electronic apparatus ED02, etc.). The connection terminal ED78 may include an HDMI connector, a USB connector, an SD card connector, and/or an audio connector (a headphone connector, etc.).

The haptic module ED79 may convert electrical signals into a mechanical stimulus (vibration, movement, etc.) or an electrical stimulus that a user may perceive through tactile or motor sensations. The haptic module ED79 may include a motor, a piezoelectric element, and/or an electrical stimulation device.

The camera module ED80 may capture a still image and a moving image. The camera module ED80 may include the image acquisition apparatus 1000 described above, and may include additional lens assembly image signal processors and/or flashes. A lens assembly included in the camera module ED80 may collect light emitted from an object to be imaged.

The power management module ED88 may manage power supplied to the electronic apparatus ED01. The power management module ED88 may be implemented as a portion of a power management integrated circuit PMIC.

The battery ED89 may supply power to components of the electronic apparatus ED01. The battery ED89 may include a non-rechargeable primary battery, a rechargeable secondary battery, and/or a fuel cell.

The communication module ED90 may support establishment of a direct (wired) communication channel and/or a wireless communication channel between the electronic apparatus ED01 and other electronic apparatuses (the electronic apparatus ED02, the electronic apparatus ED04, the server ED08, etc.), and communication through the established communication channel. The communication module ED90 operates independently of the processor ED20 (an application processor, etc.) and may include one or more communication processors supporting direct communication and/or wireless communication. The communication module ED90 may include a wireless communication module ED92 (a cellular communication module, a short-range wireless communication module, a global navigation satellite system (GNSS), etc.) and/or a wired communication module ED94 (a local area network (LAN) communication module, a power line communication module, etc.). A corresponding communication module from among these communication modules may communicate with other electronic apparatuses through the first network ED98 (a local area network such as Bluetooth, WiFi Direct, or Infrared Data Association (IrDA)) or the second network ED99 (a telecommunication network such as a cellular network, the Internet, or computer networks (LAN, WAN, etc.)). These various types of communication modules may be integrated into a single component (a single chip, etc.) or may be implemented as a plurality of separate components (multiple chips). The wireless communication module ED92 may identify and authenticate the electronic apparatus ED01 within a communication network such as the first network ED98 and/or the second network ED99 using subscriber information (an international mobile subscriber identifier (IMSI), etc.) stored in the subscriber identity module ED96.

The antenna module ED97 may transmit and/or receive signals and/or power to and/or from the outside (other electronic apparatuses, etc.). An antenna may include a radiator made of a conductive pattern formed on a substrate (a PCB, etc.). The antenna module ED97 may include one or more antennas. When a plurality of antennas are included, the communication module ED90 may select an antenna suitable for a communication method used in a communication network, such as the first network ED98 and/or the second network ED99, among the plurality of antennas. Signals and/or power may be transmitted or received between the communication module ED90 and other electronic apparatuses through the selected antenna. Other components (an RFIC, etc.) besides the antenna may be included as a portion of the antenna module ED97.

Some of the components may be connected to each other and exchange signals (command, data, etc.) through a communication method between peripheral devices (a bus, general purpose input and output (GPIO), a serial peripheral interface (SPI), a mobile industry processor interface (MIPI), etc.).

Commands or data may be transmitted or received between the electronic apparatus ED01 and the external electronic apparatus ED04, an external apparatus, through the server ED08 connected to the second network ED99. The other electronic apparatuses ED02 and ED04 may be the same as or different from the electronic apparatus ED01. All or some of the operations executed by the electronic apparatus ED01 may be executed by one or more of the other electronic apparatuses ED02, ED04, and ED08. For example, when the electronic apparatus ED01 needs to perform certain functions or services, the electronic apparatus ED01 may request one or more other electronic apparatuses to perform some or all of the functions or services instead of directly executing the functions or services. One or more other electronic apparatuses that have received the request may execute an additional function or service related to the request, and may transfer a result of the execution to the electronic apparatus ED01. To this end, cloud computing, distributed computing, and/or client-server computing technologies may be used.

Figure 15:
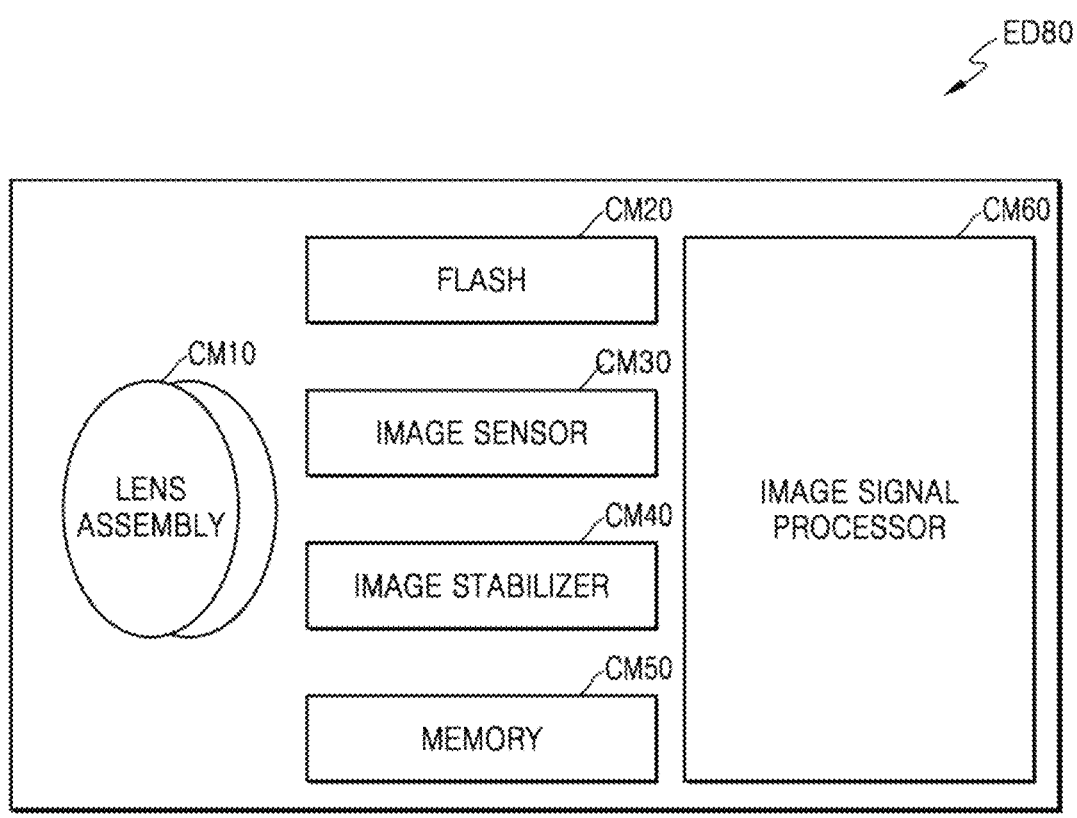
FIG. 15 is a block diagram of a camera module included in the electronic apparatus of FIG. 14.

FIG. 15 is a block diagram of the camera module ED80 included in the electronic apparatus of FIG. 14. The camera module ED80 may include the image acquisition apparatus 1000 described above, or may have a structure modified therefrom. Referring to FIG. 15, the camera module ED80 may include a lens assembly CM10, a flash CM20, an image sensor CM30, an image stabilizer CM40, a memory CM50 (a buffer memory, etc.), and/or an image signal processor CM60.

The image sensor CM30 may include the first image sensor 100 and the second image sensor 200 provided in the image acquisition apparatus 1000 described above. The first image sensor 100 and the second image sensor 200 may obtain an image corresponding to an object by converting light emitted or reflected from the object and transferred through the lens assembly CM10 into an electrical signal. The first image sensor 100 may obtain an RGB image, and the second image sensor 200 may obtain a hyperspectral image of an ultraviolet to infrared wavelength range.

In addition to the first image sensor 100 and the second image sensor 200 described above, the image sensor CM30 may further include one or more sensors selected from image sensors having different properties, such as another RGB sensor, a black and white (BW) sensor, an IR sensor, or a UV sensor. Each of the sensors included in the image sensor CM30 may be implemented as a charged coupled device (CCD) sensor and/or a complementary metal oxide semiconductor (CMOS) sensor.

The lens assembly CM10 may collect light emitted from an object to be imaged. The camera module ED80 may include a plurality of lens assemblies CM10, and in this case, may be a dual camera, a 360-degree camera, or a spherical camera. Some of the plurality of lens assemblies CM10 may have the same lens properties (field of view, focal length, autofocus, F Number, optical zoom, etc.) or different lens properties. The lens assembly CM10 may include a wide-angle lens or a telephoto lens.

The lens assembly CM10 may be configured such that two image sensors included in the image sensor CM30 form an optical image of an object at the same position and/or focus may be controlled.

The flash CM20 may emit light used to enhance light emitted or reflected from an object. The flash CM20 may include one or more light emitting diodes (a red-green-blue (RGB) LED, a white LED, an infrared LED, an ultraviolet LED, etc.), and/or a xenon lamp.

The image stabilizer CM40 may move one or more lenses included in the lens assembly CM10 or the image sensor CM30 in a specific direction in response to movement of the camera module ED80 or an electronic apparatus CM01 including the same, or may control an operating characteristic of the image sensor CM30 (adjustment of read-out timing, etc.) such that a negative effect due to movement is compensated for. The image stabilizer CM40 may detect movement of the camera module ED80 or the electronic apparatus ED01 using a gyro sensor (not shown) or an acceleration sensor (not shown) arranged inside or outside the camera module ED80. The image stabilizer CM40 may be implemented optically.

In the memory CM50, some or all of data obtained through the image sensor 1000 may be stored for the next image processing operation. For example, when a plurality of images are obtained at a high speed, the obtained original data (Bayer-patterned data, high-resolution data, etc.) may be stored in the memory CM50 and only a low-resolution image is displayed, and then the original data of a selected image (user selection, etc.) may be transferred to the image signal processor CM60. The memory CM50 may be integrated into the memory ED30 of the electronic apparatus ED01 or may be configured as a separate memory that is independently operated.

The image signal processor CM60 may perform one or more image processes on an image obtained through the image sensor CM30 or image data stored in the memory CM50. As described with reference to FIGS. 1 to 13, a first image (e.g., an RGB image) and a second image (e.g., a hyperspectral image) obtained by two image sensors included in the image sensor CM30 are processed to form a third image with an enlarged color gamut. A configuration of the processor 500 for this purpose may be included in the image signal processor CM60.

The one or more image processes may include, in addition, depth map generation, three-dimensional modeling, panorama generation, feature point extraction, image synthesis, and/or image compensation (noise reduction, resolution adjustment, brightness adjustment, blurring, sharpening, softening, etc.). The image signal processor CM60 may control (exposure time control, read-out timing control, etc.) components (the image sensor CM30, etc.) included in the camera module CM80. An image processed by the image signal processor CM60 may be stored again in the memory CM50 for further processing or may be provided to external components (the memory ED30, the display device ED60, the electronic apparatus ED02, the electronic apparatus ED04, the server ED08, etc.) of the camera module ED80. The image signal processor CM60 may be integrated into the processor CM20 or may be configured as a separate processor that operates independently of the processor CM20. When the image signal processor CM60 is configured as a separate processor from the processor ED20, an image processed by the image signal processor CM60 may be displayed through the display device ED60 after further image processing by the processor ED20.

The electronic apparatus ED01 may include a plurality of camera modules ED80 having respective attributes or functions. In this case, one of the plurality of camera modules ED80 may be a wide-angle camera, and the other may be a telephoto camera. Similarly, one of the plurality of camera modules ED80 may be a front camera, and the other may be a rear camera.

FIGS. 16 to 25 are views illustrating various examples of an electronic apparatus to which an image acquisition apparatus according to an example embodiment is applied.

Figure 16:
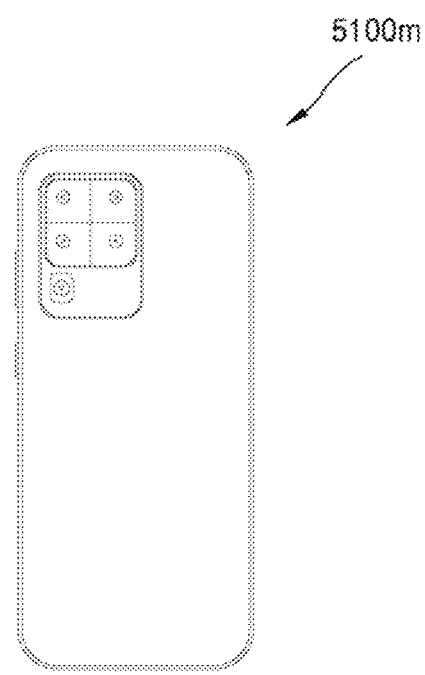
FIGS. 16 to 25 are views illustrating various examples of an electronic apparatus to which an image acquisition apparatus according to an example embodiment is applied.
Figure 17:
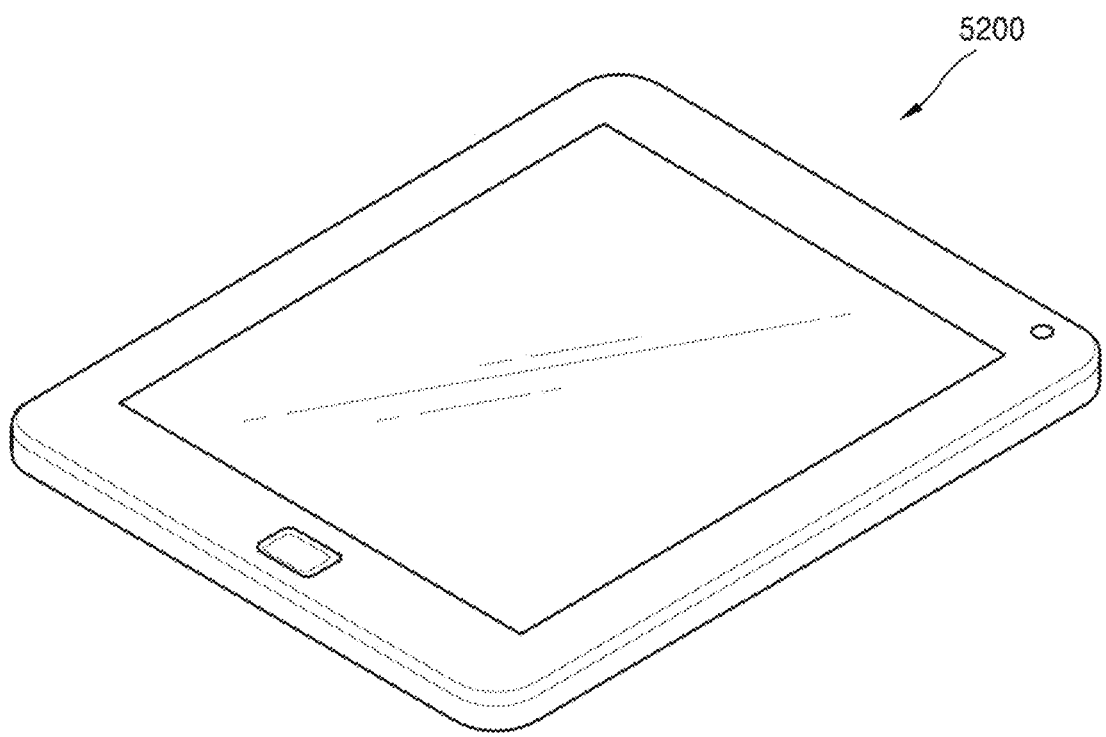
Figure 18:
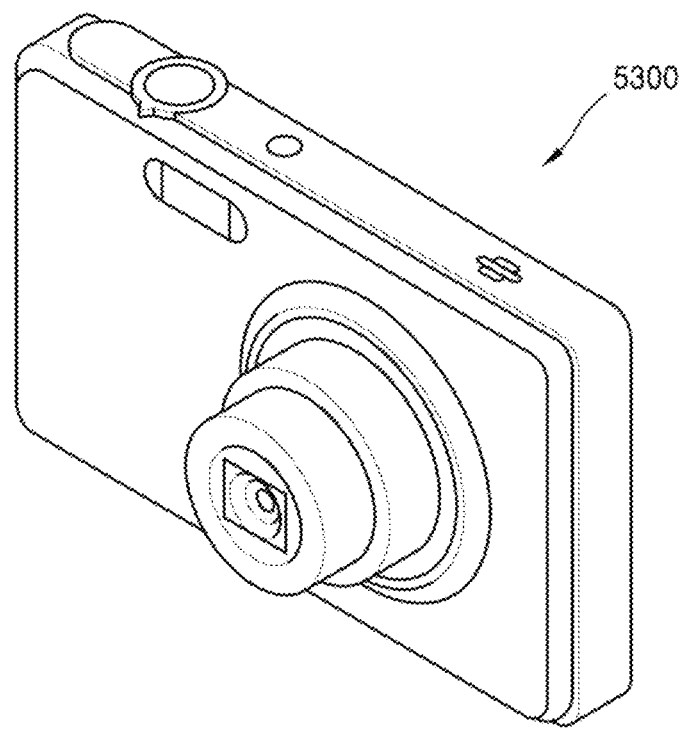
Figure 19:
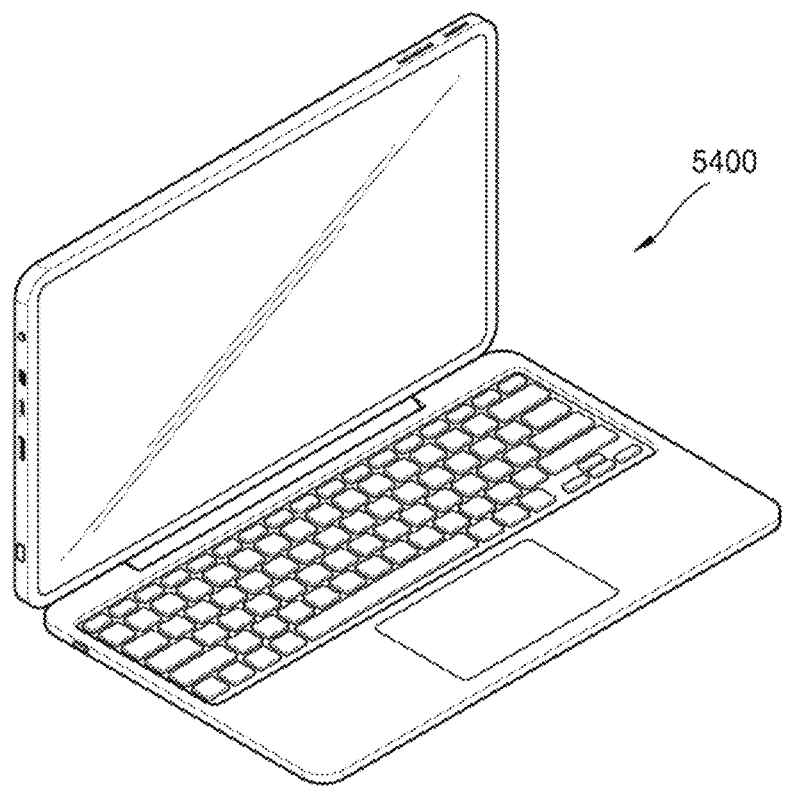
Figure 20:
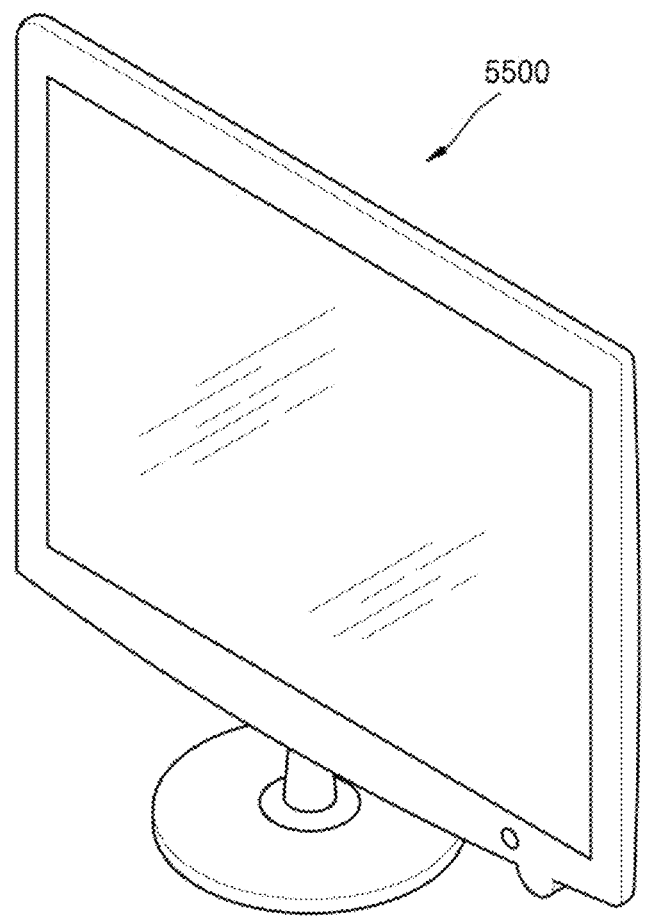

An image acquisition apparatus according to embodiments may be applied to a mobile phone or smartphone 5100m shown in FIG. 16, a tablet or smart tablet 5200 shown in FIG. 17, a digital camera or camcorder 5300 shown in FIG. 18, a laptop computer 5400 shown in FIG. 19, or a television or smart television 5500 shown in FIG. 20. For example, the smartphone 5100m or the smart tablet 5200 may include a plurality of high-resolution cameras each having a high-resolution image sensor mounted thereon. High-resolution cameras may be used to extract depth information of objects in an image, adjust out focusing of an image, or automatically identify objects in an image.

Figure 21:
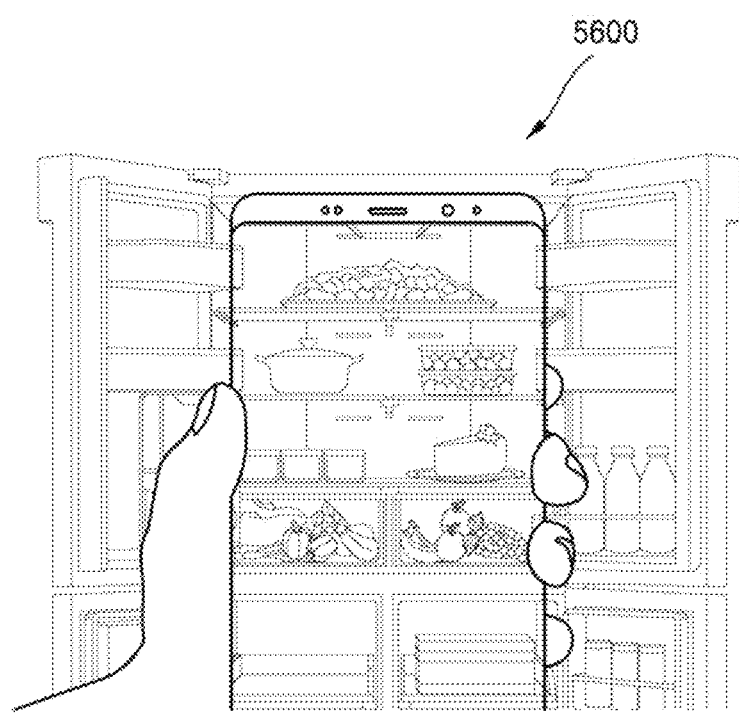
Figure 22:
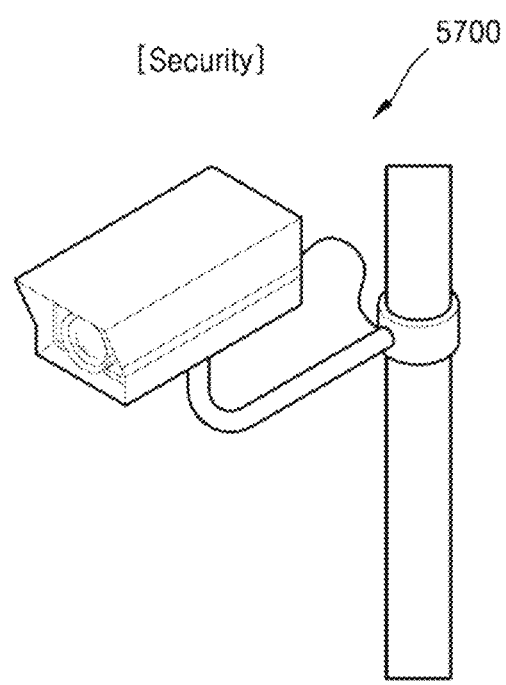
Figure 23:
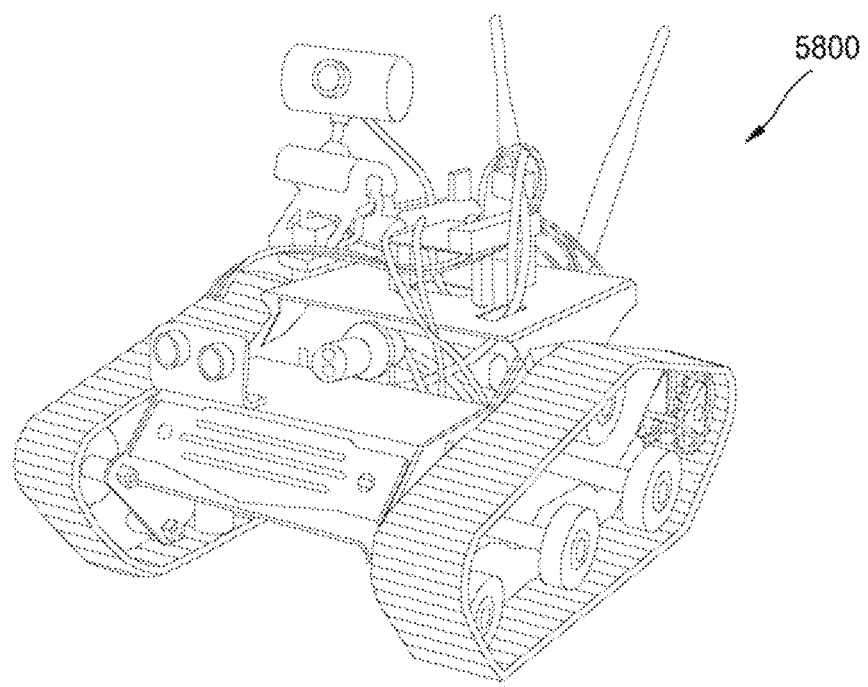
Figure 24:
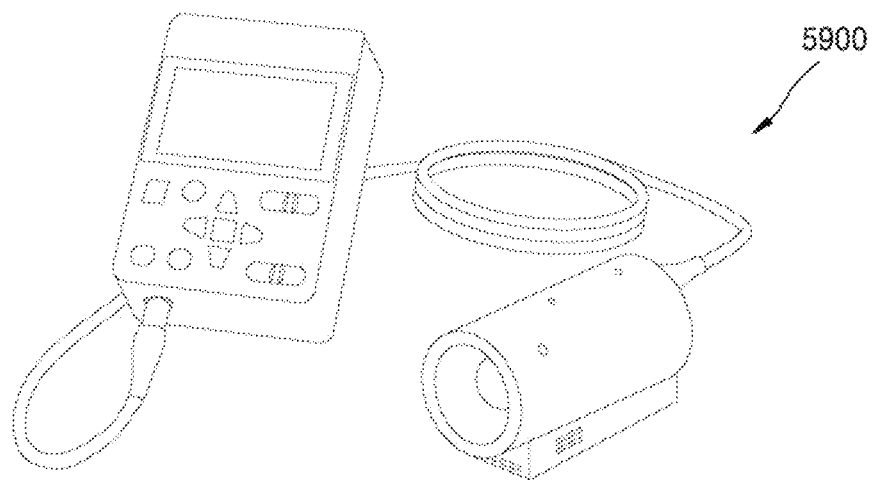

In addition, the image acquisition apparatus 1000 may be applied to a smart refrigerator 5600 shown in FIG. 21, a security camera 5700 shown in FIG. 22, a robot 5800 shown in FIG. 23, a medical camera 5900 shown in FIG. 24, and the like. For example, the smart refrigerator 5600 may automatically recognize food in a refrigerator using the image acquisition apparatus 1000, and may inform a user of the presence of specific food, the type of food received or shipped, and the like through a smartphone. The security camera 5700 may provide an ultra-high-resolution image and may recognize an object or a person in an image even in a dark environment by using high sensitivity. The robot 5800 may provide a high-resolution image by being input at a disaster or industrial site that cannot be directly accessed by humans. The medical camera 5900 may provide a high-resolution image for diagnosis or surgery, and may dynamically adjust a field of view.

Figure 25:
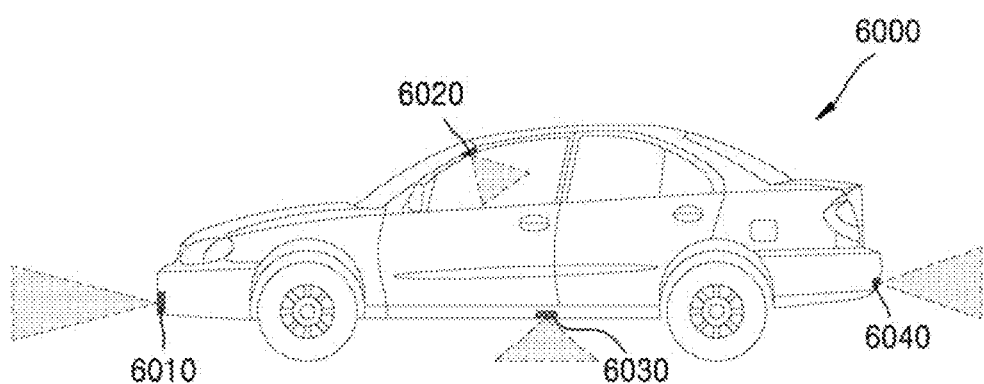

In addition, the image acquisition apparatus 1000 may be applied to a vehicle 6000 as shown in FIG. 25. The vehicle 6000 may include a plurality of vehicle cameras 6010, 6020, 6030, and 6040 arranged in various positions. Each of the vehicle cameras 6010, 6020, 6030, and 6040 may include an image acquisition apparatus according to an example embodiment. The vehicle 6000 may use a plurality of vehicle cameras 6010, 6020, 6030, and 6040 to provide a driver with various information about the interior or surroundings of the vehicle 6000, and may provide information necessary for autonomous driving by automatically recognizing objects or people in an image.

The above-described image acquisition apparatus may provide an image having high resolution and expressing a wide color gamut by using two different types of image sensors.

The above-described image acquisition apparatus may be employed in various electronic apparatuses.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image acquisition apparatus comprising:
    a first image sensor configured to obtain a first image based on detection of a light of a first wavelength band;
    a second image sensor configured to obtain a second image based on detection of a light of a second wavelength band that is wider than the first wavelength band; and
    a processor configured to obtain a third image having a spatial resolution corresponding to the first image and a color gamut corresponding to the second image, based on the first image and the second image, by determining whether color conversion is required for each of a plurality of areas of the first image, based on the second image that is obtained using the second wavelength band wider than the first wavelength band, and by performing color conversion only for an area of the first image, wherein the color gamut indicated by the second image for the area is outside a range of the color gamut indicated by the first image.

2. The image acquisition apparatus of claim 1,
    wherein the processor is further configured to correct a pixel value of the first image based on a pixel value of the second image to obtain the third image.

3. The image acquisition apparatus of claim 2,
    wherein the processor is further configured to register the first image and the second image on a two-dimensional plane, and correct the pixel value of the first image based on a correspondence relationship between pixels of the first image and pixels of the second image.

4. The image acquisition apparatus of claim 3,
    wherein the processor is further configured to register the first image and the second image after performing aberration correction on the first image and the second image.

5. The image acquisition apparatus of claim 1, wherein the processor is further configured to determine either the third image or the first image as an output image to be displayed.

6. The image acquisition apparatus of claim 1,
    wherein the processor is further configured to determine the first image and a difference image between the first image and the third image to be displayed.

7. The image acquisition apparatus of claim 1,
    wherein the first image indicates a first color gamut, and the third image indicates a second color gamut that is wider than the first color gamut.

8. The image acquisition apparatus of claim 1,
wherein the first image sensor comprises:
- a first pixel array comprising a first sensor layer in which a plurality of first sensing elements are arrayed; and
- a color filter arranged on the first sensor layer and comprising red filters, green filters, and blue filters that are alternately arranged.

9. The image acquisition apparatus of claim 8,
wherein the second image sensor comprises:
- a second pixel array comprising a second sensor layer in which a plurality of second sensing elements are arrayed; and
- a spectral filter arranged on the second sensor layer, in which a plurality of filter groups that are repeatedly arranged, and
wherein each of the plurality of filter groups comprises a plurality of unit filters having different transmission wavelength bands.

10. The image acquisition apparatus of claim 9,
wherein each of the transmission wavelength bands of the plurality of unit filters comprises a visible light band and has a wavelength band wider than the visible light band.

11. The image acquisition apparatus of claim 10,
wherein each of the plurality of filter groups comprises 16 unit filters arranged in a 4×4 array.

12. The image acquisition apparatus of claim 9,
wherein the first pixel array and the second pixel array are horizontally apart from each other on a same circuit board, to have a same focal length and a same field of view.

13. The image acquisition apparatus of claim 12,
wherein the circuit board comprises first circuit elements processing a first signal from the first sensor layer and second circuit elements processing a second signal from the second sensor layer.

14. The image acquisition apparatus of claim 13, further comprising a timing controller configured to synchronize operations of the first circuit elements and the second circuit elements.

15. The image acquisition apparatus of claim 12, further comprising a memory in which data related to the first image and data related to the second image are stored.

16. The image acquisition apparatus of claim 15,
wherein the memory is provided in the circuit board.

17. The image acquisition apparatus of claim 1, further comprising:
- a first imaging optical system that forms the first image of an object on the first image sensor and comprises one or more first lenses; and
- a second imaging optical system that forms the second image of the object on the second image sensor and comprises one or more second lenses.

18. The image acquisition apparatus of claim 17,
wherein the first imaging optical system and the second imaging optical system are set to have a same focal length and a same field of view.

19. An electronic apparatus comprising:
- an RGB sensor configured to detect a first light of a first wavelength band that is reflected from an object;
- a hyperspectral image sensor to detect a second light of a second wavelength band that is reflected from the object, wherein the second wavelength band is wider than the first wavelength band; and
- a process configured to:
  - obtain a first image based on the first light of the first wavelength band, and a second image based on the second light of the second wavelength band;
  - align the first image with the second image, based on position information of edges detected from the first image and the second image;
  - determine whether color conversion is required for each of a plurality of areas of the first image, based on the second image that is obtained using the second wavelength band wider than the first wavelength band; and
  - convert color of the first image only for an area of the first image, while the first image is aligned with the second image, wherein the color gamut indicated by the second image is outside a range of the color gamut indicated by the first image.

20. The electronic apparatus of claim 19, wherein the electronic apparatus corresponds to:
a mobile phone, a smartphone, a tablet, a smart tablet, a digital camera, a camcorder, a laptop computer, a television, a smart television, a smart refrigerator, a security camera, a robot, or a medical camera.

* * * * *